(12) United States Patent
Tobiason et al.

(10) Patent No.: US 7,075,097 B2
(45) Date of Patent: Jul. 11, 2006

(54) OPTICAL PATH ARRAY AND ANGULAR FILTER FOR TRANSLATION AND ORIENTATION SENSING

(75) Inventors: Joseph Daniel Tobiason, Woodinville, WA (US); Michelle Mary Milvich, Seattle, WA (US); Michael Nahum, Kirkland, WA (US); Vidya Venkatachalam, Bellevue, WA (US)

(73) Assignee: Mitutoyo Corporation, Kawasaki (JP)

( * ) Notice: Subject to any disclaimer, the term of this patent is extended or adjusted under 35 U.S.C. 154(b) by 272 days.

(21) Appl. No.: 10/808,849

(22) Filed: Mar. 25, 2004

(65) Prior Publication Data

US 2005/0211885 A1 Sep. 29, 2005

(51) Int. Cl.
*G01N 21/00* (2006.01)
(52) U.S. Cl. .............................. 250/559.27; 250/206.1; 250/216; 250/227.11
(58) Field of Classification Search ........... 250/559.29, 250/559.37, 559.38, 216, 227.11, 206, 206.1; 356/616; 359/619; 385/12, 115, 116, 120
See application file for complete search history.

(56) References Cited

U.S. PATENT DOCUMENTS

| | | | |
|---|---|---|---|
| 4,733,071 A | | 3/1988 | Tokunaga |
| 5,104,225 A | | 4/1992 | Masreliez |
| 5,321,251 A | * | 6/1994 | Jackson et al. .......... 250/208.1 |
| 5,453,838 A | | 9/1995 | Danielian et al. |
| 5,889,593 A | * | 3/1999 | Bareket ....................... 356/445 |
| 5,909,283 A | | 6/1999 | Eselun |
| 6,034,378 A | * | 3/2000 | Shiraishi ................ 250/559.29 |
| 6,642,506 B1 | | 11/2003 | Nahum et al. |
| 6,759,669 B1 | * | 7/2004 | Schmitz et al. ........ 250/559.29 |
| 2002/0105656 A1 | | 8/2002 | Nahum et al. |
| 2002/0179819 A1 | | 12/2002 | Nahum |

(Continued)

OTHER PUBLICATIONS

Chapman, G.H., et al., "Angular Domain Imaging of Objects Within Highly Scattering Media Using Silicon Micromachined Collimating Arrays," *IEEE Journal of Selected Topics in Quantum Electronics* 9(2):257–266, Mar./Apr. 2003.

*Primary Examiner*—Stephone B Allen
*Assistant Examiner*—Davienne Monbleau
(74) *Attorney, Agent, or Firm*—Christensen, O'Connor, Johnson, Kindness PLLC

(57) ABSTRACT

A position sensor using a novel optical path array (OPA) element, an angle-selective spatial filter, and an imaging array is capable of measuring the translation and orientation relative to a target member in X, Y, Z, yaw, pitch, and roll ("6D") simultaneously, and with high precision. A target member includes an array of target points surrounded by a contrasting surface. The position sensor uses the OPA element in combination with the angle-selective spatial filter in a target point imaging arrangement such that the imaging array of the position sensor only receives light rays that enter the OPA element according to an operable cone angle $\alpha$. Accordingly, each target point generally produces a ring-shaped image having a size on the imaging array that varies with the Z position of each target point. The X-Y position of each target point image on the imaging array varies with the X-Y position of each target point. Accordingly, three or more target point images analyzed in the same image are usable to determine a 6D measurement relative to the target member. X and Y displacement of the target member can be accumulated by known methods and the other 6D measurement components are absolute measurements at any position.

27 Claims, 20 Drawing Sheets

U.S. PATENT DOCUMENTS

| | | |
|---|---|---|
| 2003/0026457 A1 | 2/2003 | Nahum |
| 2003/0026458 A1 | 2/2003 | Nahum |
| 2003/0058423 A1* | 3/2003 | Wakamoto .................. 355/53 |
| 2003/0067591 A1* | 4/2003 | Komatsuda ................. 355/67 |
| 2003/0090681 A1 | 5/2003 | Jones et al. |
| 2003/0095710 A1 | 5/2003 | Tessadro |
| 2003/0133099 A1* | 7/2003 | Shiode ....................... 356/124 |
| 2004/0080737 A1* | 4/2004 | Jasper et al. ................. 355/55 |

* cited by examiner

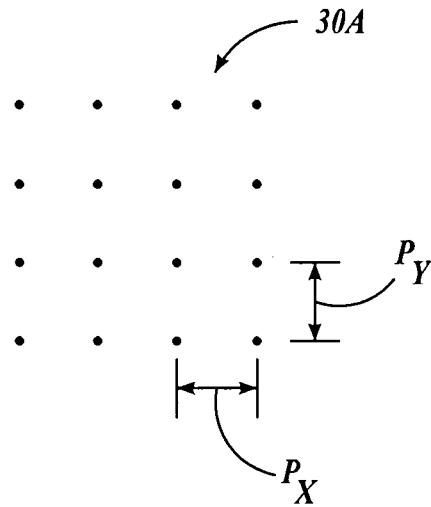
*Fig.3A.*
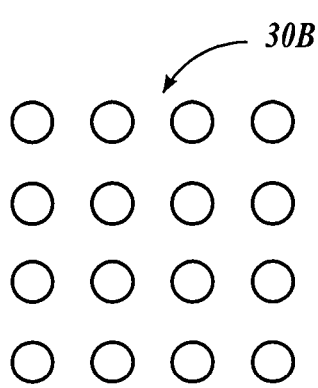    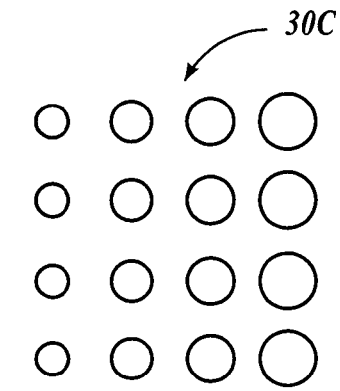    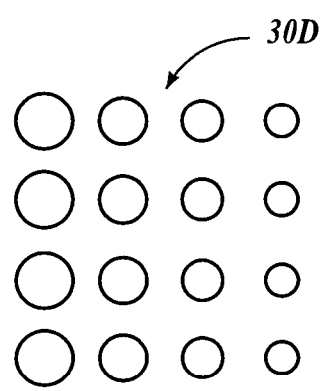
*Fig.3B.*          *Fig.3C.*          *Fig.3D.*
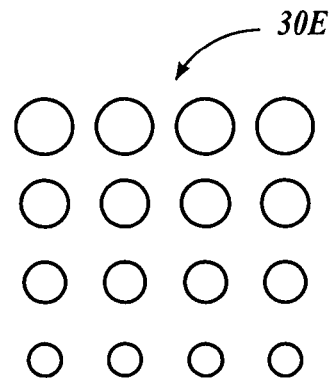    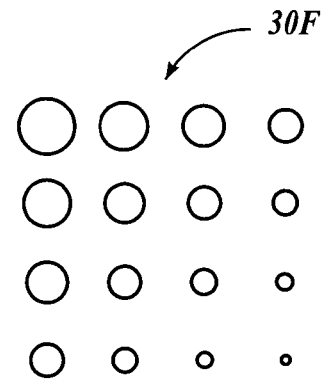
*Fig.3E.*          *Fig.3F.*

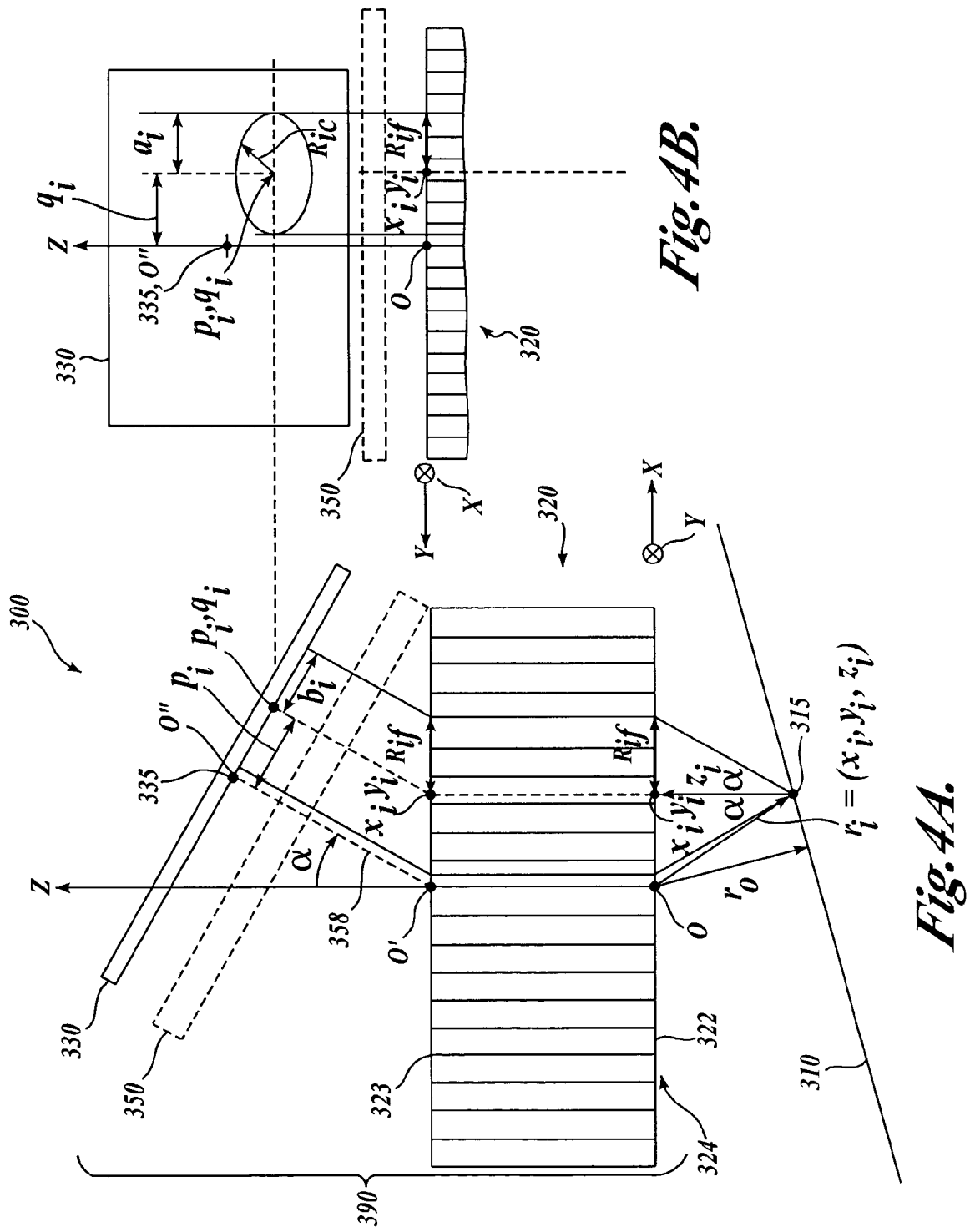

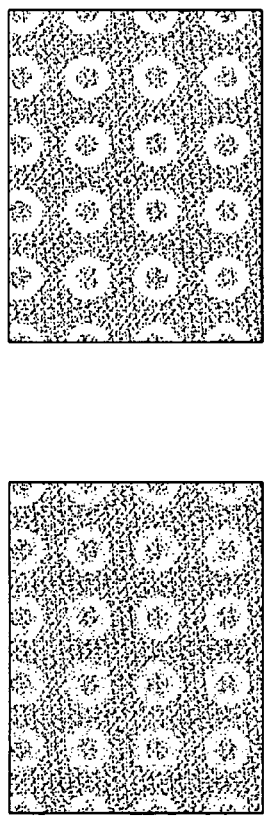
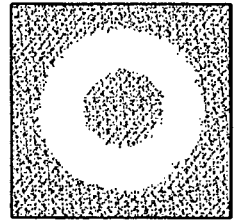
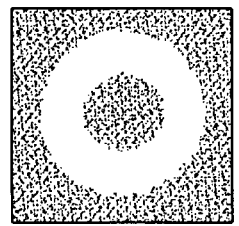
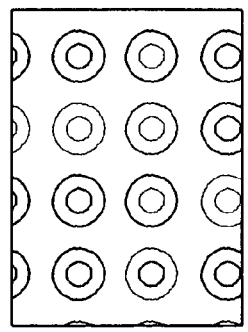
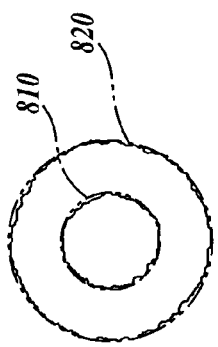
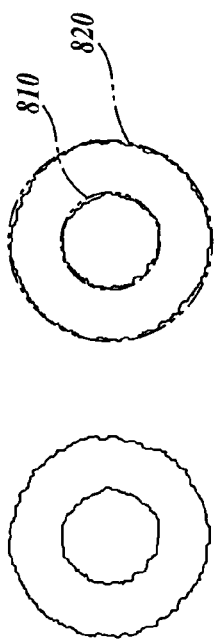
Fig. 8.

OPTICAL PATH ARRAY AND ANGULAR FILTER FOR TRANSLATION AND ORIENTATION SENSING

FIELD OF THE INVENTION

This invention relates generally to optical position sensors, and, more particularly, to a multi-axis optical position sensor utilizing an optical path array and angular filter.

BACKGROUND OF THE INVENTION

Various accurate 2-dimensional (2D) optical position sensing systems are known. For example, one 2D incremental position sensor using a 2D grating scale and providing high resolution and high accuracy for sensing translation in an X-Y plane is disclosed in U.S. Pat. No. 5,104,225, to Masreliez, which is incorporated herein by reference in its entirety. Such a system is essentially an orthogonal combination of well known 1-dimensional (1D) optical encoder "incremental" measurement techniques that sense the position of a readhead within a particular period of a periodic scale grating for high resolution and continuously increment and decrement a count of the number of periods of the periodic scale that are traversed during a series of movements, in order to continuously provide a net relative displacement between the readhead and scale. However, such systems cannot sense the "z-axis" separation between a readhead and scale.

A very limited number of types of optical position sensors capable of sensing more than two degrees of freedom of a relative position of an object are known. One system comprising a probe that can sense relative position for up to 6 degrees of freedom is disclosed in U.S. Pat. No. 5,452,838, to Danielian and Neuberger. The '838 patent discloses a probe using a fiber optic bundle, with individual fibers or sets of fibers acting as individual intensity sensing channels. The individual intensity signals vary with X-Y motion of an illuminated target surface, as well as with the proximity of each fiber to the illuminated target surface along a direction normal to the surface. However, the probe disclosed in the '838 patent provides relatively crude measurement resolution and a limited sensing range for "z-axis" separation and orientation between the probe and a target surface.

Known dual-camera "stereoscopic" triangulation systems can sense relative position for up to 6 degrees of freedom. However, such known dual-camera systems are generally relatively large systems developed for measuring macroscopic objects and/or their positions, which do not scale well to relatively compact precision position measuring systems usable in close proximity to their target object. Furthermore, the triangulation arrangement of such known systems generally constrains the relationship between the z-axis measurement resolution and the z-axis measurement range in a restrictive and undesirable manner.

Systems that can image an object and determine x-y position from a feature in the image and z-axis position and orientation based on varying magnification in the image are also known. However, the magnification arrangement of such known systems generally constrains the relationship between the z-axis measurement resolution and the z-axis measurement range in a restrictive and undesirable manner, and introduces other problems requiring special image processing and/or compensation in order to accurately measure a relative position with up to 6 degrees of freedom.

SUMMARY OF THE INVENTION

The present invention is directed to providing a position sensor that overcomes the foregoing and other disadvantages. More specifically, the present invention is directed to an optical position sensor utilizing an "optical path array" element (OPA element), an angular filter, and an imaging array to provide high accuracy simultaneous measurements for up to 6 degrees of freedom for an object (multiple-dimension, or "6D", measurements), including any one of, or combination of, X, Y, Z, yaw, pitch, and roll.

Depending on the design parameters chosen for the OPA element, the angular filter, and the imaging array, the applications of an optical position sensor according to this invention include, but are not limited to, precision position sensors for metrology, motion control systems and the like, as well as relatively lower resolution and/or longer range sensors usable for computer input devices, multi-degree-of-freedom manual machine controllers, macroscopic object ranging and orientation measurement systems, and the like.

In accordance with one aspect of the invention, the optical path array element comprises a plurality of optical paths through a plurality of optical path elements. The optical path array element is positionable to input image light arising from target features on a target member. In various exemplary embodiments, the target features are arranged on a background that provides good image contrast for image features that arise from the target features. In various exemplary embodiments, the target features are arranged in a two-dimensional periodic array on the target member. In various exemplary embodiments, the target features are point features.

In accordance with another aspect of the invention, an angular filter portion has an optical axis, and the angular filter portion is positioned to receive output image light from the optical path array element and transmit only certain direction-selected light rays of the output image light to form an image on the array detector. The image on the array detector includes respective image features corresponding to respective target features on the target member. Because of the light ray direction selecting characteristics of the angular filter portion, each respective image feature corresponding to a respective target feature is defined by a set of light rays of the input image light that enter a respective operable set of the optical path elements of the optical path array element. That is, the operable set of the optical path elements for a target feature is the set of optical path elements that receive the light rays from that target feature that are selected by the angular filter portion.

In accordance with a further aspect of the invention, in one embodiment, the angular filter portion comprises a first lens and an aperture arranged along the optical axis in a singly telecentric optical arrangement to select light rays that are parallel to the optical axis. In one embodiment, the angular filter portion further comprises a second lens arranged to provide a doubly telecentric arrangement.

In accordance with a further aspect of the invention, in one embodiment, the angular filter portion comprises a collimating array, that is an array or bundle of miniature tube-like structures that have a sufficiently small acceptance angle for incoming rays. In one embodiment, the collimating array is a silicon micro-machined collimating array.

In accordance with a further aspect of the invention, when the target feature is a point feature and the angular filter portion selects light rays that are parallel to its optical axis, the operable set of the optical path elements is a set of optical path elements that are arranged at a polar angle relative to an axis that extends from the target feature along a direction normal to a planar input face of the optical path element. The particular polar angle is determined by the light ray direction selecting characteristics of the angular filter portion. The polar angle is furthermore the cone angle of a hypothetical cone with an apex at the target point. Thus, in accordance with a further aspect of the invention, in various exemplary embodiments, the target point light rays selected for imaging onto the array detector by the angular filter portion arise from a circular pattern or set of optical path elements that lie on the section of the hypothetical cone that intersects with the plane of the input faces of the optical path elements.

In accordance with a further aspect of the invention, in various exemplary embodiments where the optical axis of the angular filter portion is tilted away from the axis of the circular pattern, the circular pattern is imaged on the array detector as an ellipse.

In accordance with a further aspect of the invention, the circular pattern of optical path elements that participate in and define the circular or elliptical (ring-shaped) image of a target point has a size that varies with the separation along a direction parallel to the cone axis between the optical path array element and the target point on the target member. The size of the ring-shaped image of a target point can thus be used to determine an absolute z-axis coordinate for the target point relative to the optical path array element. In accordance with a further aspect of the invention, the location of the center of the ring-shaped image of a target point on the array detector can be used to determine the location of the target point along a plane parallel to the input face of the optical path array element, and can thus be used to determine the displacement of the target point relative to the input face of the optical path array element, along an x-y plane input face of the optical path array element. Thus, a set of (x,y,z) coordinates can be determined for any such imaged target point, and given the (x,y,z) coordinates of three such target points, a 6-degree-of-freedom relative position can be determined between a target member and a position measuring device according to this invention.

In accordance with another aspect of the invention, the image of a target point is a blurry image having respective radial intensity profiles comprising the intensity values of respective sets of image pixels of the ring-shaped image feature lying along respective radial directions extending from a nominal center of the ring shaped feature. In various exemplary embodiments according to this invention, a function of a circle or an ellipse is fitted to a set of respective peaks determined for the set of respective radial intensity profiles. In various embodiments, scaling in x and y is performed to correct for magnification or image aberrations before the respective peaks are determined. In either case, the resulting fit function provides a high accuracy estimate of the size (a radial dimension) and center location of the image feature at a sub-pixel interpolation level, and thus can be used to determine the corresponding (x,y,z) coordinates of any imaged target point, and the resulting relative position determination with a similar high accuracy.

In accordance with another aspect of the invention, the position measuring device further comprises a light source for illuminating the target member. In accordance with a further aspect of the invention the light source is positioned to illuminate the target member through the optical path array element.

In accordance with another aspect of the invention, in one embodiment the optical axis of the angular filter portion is arranged along a direction that is approximately normal to a reference plane that is parallel to the input face of the optical path array element, and output image light from the optical path array element is refracted at a refracting surface that is inclined at an angle relative to the reference plane, such that direction-selected light rays that are approximately parallel to the optical axis comprise light rays that are refracted at the refracting surface. In various embodiments, the refracting surface is provided by the surface of a prism element, or by the angled output ends of a set of optical fibers that are used to form the optical path array element.

In accordance with a further aspect of the invention, in one embodiment the position measuring device comprises a light source and a beam splitter and the angular filter portion comprises a first lens arranged to receive light rays that are refracted at a refracting surface and an aperture arranged at a focal plane where the light rays that are input to the first lens parallel to the optical axis are nominally focused. The beam splitter is arranged along the optical axis between the first lens and the aperture such that the light rays from the first lens pass through the beam splitter before being nominally focused at the focal plane, and the light source is arranged relative to the beam splitter such that illumination from the light source is deflected by the beam splitter to pass through the first lens and the optical path array element to illuminate the target member.

In accordance with another aspect of the invention, a position sensing device including various elements outlined above provides images on the array detector that include at least two respective image features corresponding to respective target features, and when a separation between the position sensing device and the target member is increased, the size of each of the corresponding respective image features increases on the array detector, but a spacing between respective nominal centers of the respective image features does not change on the array detector.

In accordance with another aspect of the invention, in various exemplary embodiments, the optical path array element comprises an optical fiber bundle comprising parallel optical fibers, the input ends of the plurality of parallel optical fibers forming a planar image light input surface and a reference plane. In accordance with a further aspect of the invention, the parallel optical fibers are nominally cylindrical. In some embodiments, they have a diameter of at least 3 μm and at most 80 μm. However, this example is illustrative only, and not limiting. In various other lower-accuracy embodiments, a larger diameter may be used, up to 200 μm or more.

In accordance with another aspect of the invention, in various exemplary embodiments, the optical path array element comprises a two-dimensional array of coplanar axicon lenses arranged such that the input image light from the target member is input to the plurality of the axicon lenses and is refracted at least at the conical surface of each of the plurality of axicon lenses, to provide the output image light received by the angular filter portion. In accordance with a further aspect of the invention, the conical surface of each axicon lens is either a protruding surface or an intruding surface. In some embodiments, two times an average radial dimension from the central axis to a nominal edge or radial limit of each axicon lens is at least 3 μm and at most 150 μm.

In accordance with a further aspect of the invention, in various exemplary embodiments the conical surface of each axicon lens is oriented towards the target member, and the direction-selecting characteristics of the angular filter portion are such that it is operable to transmit only direction-selected light rays of the output image light that are refracted along a direction that is approximately normal to a nominal plane of the coplanar axicon lenses.

In accordance with another aspect of the invention, in various exemplary embodiments, each optical path element of an optical path array element according to this invention comprises a refractive axicon-type lens, or a refractive faceted pyramidal-type lens, or a relatively long and narrow ridge-like element having a prismatic cross section, or a diffractive optical element that deflects light rays approximately like a refractive axicon-type lens, or a diffractive optical element that deflects light rays approximately like a refractive faceted pyramidal-type lens, or a diffractive optical element that deflects light rays approximately like a relatively long and narrow ridge-like element having a prismatic cross section. A coplanar 2-dimension array of such lenses is arranged such that the input image light from the target member is input to the plurality of lenses and is effectively deflected by the lenses, to provide the output image light received by the angular filter portion.

In accordance with another aspect of the invention, each optical path element comprises a relatively long and narrow ridge-like element having a prismatic cross section, and the target member comprises a plurality of respective unique patterns usable to uniquely identify a respective region of the target member.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 3A–3F are diagrams illustrating a target point pattern and various representative ring image patterns that are produced by a position sensor arrangement according to this invention in various orientations relative to a target point pattern;

FIG. 4A is a schematic diagram illustrating an exemplary set of coordinate relations for indicating the location of various ring images arising from a target point, usable with the first generic embodiment of a position sensor arrangement according to this invention, viewed along the Y-axis direction of the position sensor arrangement;

FIG. 4B is a diagram illustrating a view looking along the X-axis direction of the position sensor arrangement of FIG. 4A;

FIG. 8 depicts a third exemplary image provided according to this invention, along with the results obtained from one exemplary set of image processing operations usable to identify various target feature characteristics to be measured;

DETAILED DESCRIPTION OF THE PREFERRED EMBODIMENT

Figure 1:
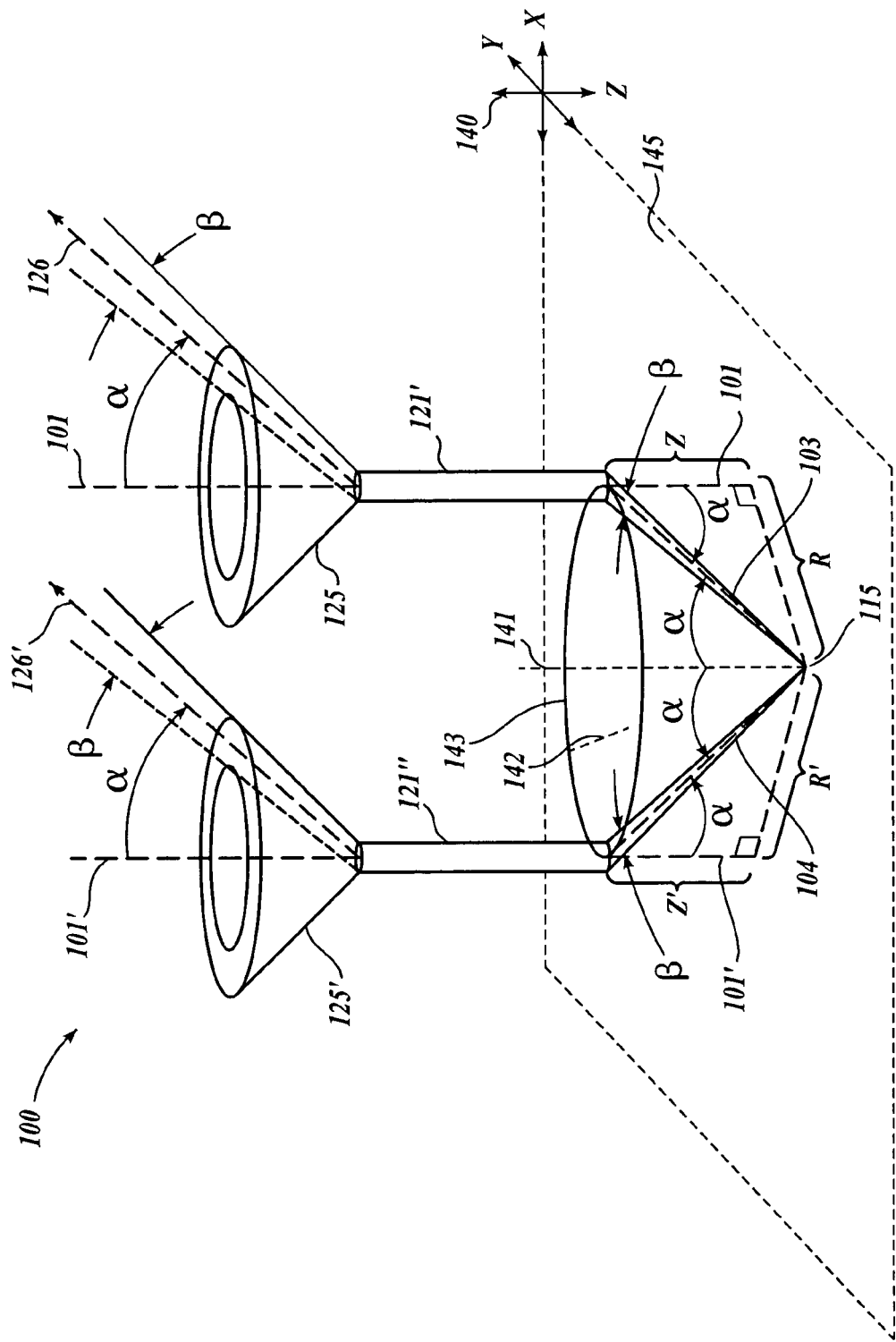
FIG. 1 is an isometric view showing an optical fiber OPA configuration that illustrates the operation of differently located single optical fibers included in an optical fiber bundle usable as an optical path array element according to this invention.

FIG. 1 is an isometric view showing an optical fiber optical path array (OPA) configuration 100 that illustrates the operation of differently located single optical fibers, 121' and 121", respectively, included in an optical fiber bundle usable as an optical path array element (OPA element) according to this invention. As will be described in greater detail below, in various exemplary embodiments of a position sensor according to this invention, an angular filtering arrangement determines that only light output along a particular respective operable direction from each respective optical fiber of an optical fiber bundle used as an OPA element of the position sensor will reach an optical detector of the position sensor. Thus, it should be appreciated that an operable polar angle α referred to in the following description is dictated by the particular arrangement of a particular position sensor in various exemplary embodiments according to this invention, as described in greater detail with reference to FIG. 2, below. Accordingly, it should be appreciated that for purposes of explanation, in FIG. 1 a point 115 and/or the input ends of the optical fibers 121' and 121" are shown at "selected" locations that conform to a dictated operable angle α. However, it should not be understood that in the general case the point 115 and the input ends of the optical fibers 121' and 121" establish the operable polar angle α. Rather, it should be appreciated that in the general case, combinations of points and optical fiber input ends that are positioned so that they do not conform to a dictated operable polar angle α are non-operable. That is, optical paths corresponding to angles of incidence other than α are blocked by the angular filtering arrangement that dictates the operable polar angle α in various exemplary embodiments according to this invention.

FIG. 1 shows the respective operable direction/optical path 126 from the optical fiber 121', and the respective operable direction/optical path 126' from the optical fiber 121". In the exemplary optical fiber OPA configuration 100 shown in FIG. 1, the operable directions of the operable direction/optical paths 126 and 126' are parallel. The optical fibers 121' and 121" have corresponding axes 101 and 101', respectively, that are also parallel. Therefore, each of the operable directions/optical paths 126 and 126' are oriented at the same longitudinal angle (not labeled) about the axes 101 and 101', respectively. Furthermore, each of the operable directions/optical paths 126 and 126' are oriented at the same operable polar angle α relative to the axes 101 and 101', respectively.

As shown in FIG. 1, the two optical fibers 121' and 121" are optical fibers that are located at respective operable positions relative to a point 115. That is, the axes 101 and 101' of the optical fibers 121' and 121", respectively, are located such that each of the optical fibers 121' and 121" can each receive light from the point 115 at the operable polar angle α relative to their respective axes. Specifically, the optical fiber 121' is oriented along the axis 101 and, at its lower end in FIG. 1, which is the input end or front end, receives a narrow beam of light rays 103 from the point 115. Or, stated another way, the front end of the optical fiber 121' lies at a position that satisfies the condition that light from the point 115 enters the front end at the operable polar angle α relative to the fiber axis 101. As will be described in more detail below, the light from the light rays 103 exits the optical fiber 121' at its upper or back end to form a light cone 125.

The optical fiber 121' transfers light from the input end face to the other end by internal reflection, thereby preserving the nominal angle α of the beam of light rays 103. This means that, assuming that the ends of the fiber 121' are nominally perpendicular to its axis 101 so that refraction at the ends can be neglected, light that enters the fiber 121' at the operable polar angle α will exit at the other end of the fiber distributed around a light cone 125 having a nominal operable cone angle α. In addition, the light received by the optical fiber 121' from the point 105 encompasses an angle β, and at the output of the optical fiber 121' the light cone 125 nominally encompasses the same angle β in a plane lying along a radial direction with respect to the axis 101.

As previously indicated, the light of the light cone 125 that is output approximately parallel to the operable direction/optical path 126 will pass through the angular filtering arrangement of a position sensor according to this invention, to reach an optical detector of the position sensor. In various exemplary embodiments according to this invention, the optical detector is a 2-dimensional array detector, and the light of the light cone 125 that is output approximately parallel to the operable direction/optical path 126 strikes a respective pixel or a small group of pixels of the optical detector to form a portion of an image on the optical detector.

The optical fiber 121" operates similarly to the optical fiber 121'. Specifically, the optical fiber 121" is oriented along the axis 101' and the front end of the optical fiber 121" also lies at a position that satisfies the condition that light from the point 115 enters the input end at the operable polar angle α relative to the fiber axis 101'. A narrow beam of light rays 104 from the point 115 propagates through the optical fiber 121" and exits at its back end to form a light cone 125' that also has the nominal operable cone angle α. Thus, the light of the light cone 125' that is output approximately parallel to the operable direction/optical path 126' will also pass through the angular filtering arrangement of the position sensor according to this invention, to reach the optical detector. As previously mentioned, in various exemplary embodiments, the optical detector is a 2-dimensional array detector, and the light that is output approximately parallel to the optical path 126' strikes a respective pixel or a small group of pixels of the optical detector to form another portion of the image on the optical detector.

Accordingly, it should be appreciated that, in various exemplary embodiments according to this invention, the same point 115 is imaged onto an optical detector at a plurality of locations on the optical detector. For example, for the embodiment of the optical fiber OPA configuration 100 shown in FIG. 1, the same point 115 would be imaged onto two locations on the position detector that receive the light transmitted along the two separate optical paths 126 and 126'. Of course, it should be appreciated that the spatial relationship between the optical paths 126 and 126' may be altered by various optical elements before reaching the optical detector, as described further below.

As shown in FIG. 1, the input ends of the optical fibers coincide with a location on the surface of a hypothetical cone 142 that has a cone axis 141 that is parallel to the optical fiber axes 101 and 101', an apex located at the point 115, and a cone angle that is equal to the operable polar angle α. A hypothetical plane 145, and generic dimensions Z and R, are also shown in FIG. 1. The hypothetical plane 145 coincides with the point 115 and is oriented normal to the cone axis 141. The dimension Z is the distance between an optical fiber input end and the hypothetical plane 145, along the direction perpendicular to the plane 145 and the distance R is the radius from the point 115 to the intersection of the optical fiber axis and the plane 145.

In this exemplary embodiment, if the input end of an optical fiber is not positioned on the hypothetical cone 142, then it will not image the point 115 onto the optical detector, as described above. Conversely, in this exemplary embodiment, it should be appreciated that any optical fiber that has an axis parallel to the cone axis 141 and an input end positioned on the cone 142 is operably positioned to produce an image of the point 115 on the optical detector, as described above. Furthermore, it should be appreciated that in order to satisfy this condition for this exemplary embodiment, if the dimension Z (or Z', etc.) increases then the corresponding dimension R (or R', etc.) must also increase in order for an optical fiber input end to be operably positioned according to the operable polar angle α, on the cone 142.

The optical fibers 121' and 121" are representative of optical fibers in various exemplary embodiments according to this invention, that are included in a densely packed fiber bundle comprising a set of optical fibers having parallel axes and input ends that form a plane approximately perpendicular to the fiber axes. In such a case, relative to the point 115, Z and R will be the same for each optical fiber input end that is operable, and the operable input fiber ends will lie on a circle such as the circle 143 shown in FIG. 1.

For example, when $Z=Z_1$, the operable optical fiber input ends will be a set of input ends forming a circle of radius $R_1=Z_1/\tan \alpha$. In various exemplary embodiments, an image corresponding the circle of radius $R_1$ will be formed on the optical detector of a position sensor arrangement according to this invention. If the separation between the point 115 and the fiber bundle including the fibers 121' and 121" is then increased to $Z=Z_2$, the operable optical fiber input ends will be a new set of input ends, of a different set of optical fibers, forming a larger circle of radius $R_2=Z_2/\tan \alpha$. Accordingly, in various exemplary embodiments, a larger image corresponding the larger circle of radius $R_2$ will be formed on the optical detector of the position sensor arrangement according to this invention.

Thus, more generally, it should be appreciated that in various position sensor arrangements according to this invention, a target point that is imaged onto the optical detector of the position sensor arrangement gives rise to a corresponding target feature image having a size that varies in a manner corresponding to the separation between the point and the input ends of a fiber bundle of the position sensor arrangement. It should also be appreciated, that provided that the fiber bundle of the position sensor arrangement does not move relative to the point 115 along the X-axis or the Y-axis as defined by the coordinate system 140 shown in FIG. 1, the nominal center of the circle of operable input ends will not change. Therefore, the position of the nominal center of the corresponding image feature of the point that is imaged onto the optical detector of the position sensor arrangement will not change on the position detector in such a case, regardless of the size of the target feature image due to changes in Z. However, if the fiber bundle of the position sensor arrangement does move relative to the point 115 along the X-axis or the Y-axis, the nominal center of the circle of operable input ends will change, and the position of the nominal center of the corresponding image feature will change correspondingly on the optical detector. Thus, according to the foregoing description, a position sensor arrangement according to this invention can image as little as a single target point in various exemplary embodiments and provide an image on an optical detector that is usable to determine a 3-dimensional relative position between the single point and the position sensor arrangement, and/or any component of that 3-dimensional relative position.

Figure 2:
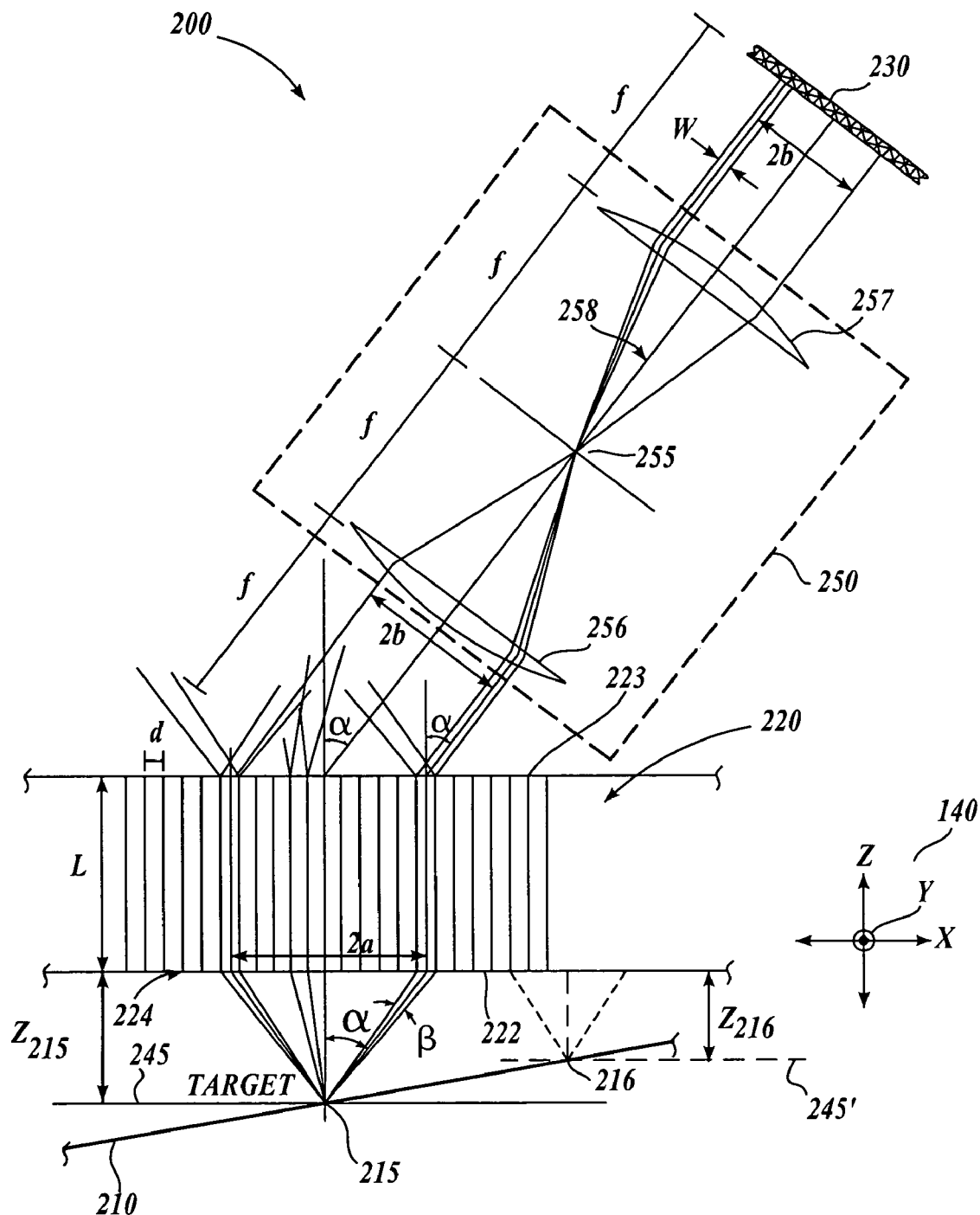
FIG. 2 is a detailed partially schematic view of a first generic embodiment of a position sensor arrangement in accordance with this invention.

FIG. 2 shows a detailed partially schematic view of a first generic embodiment of a position sensor arrangement 200 according to this invention. As shown in FIG. 2, the position sensor arrangement 200 includes a target member 210 including target points 215 and 216, an OPA element 220 that has an image light input face 222 and an image light output face 223 (comprising an optical fiber bundle as shown FIG. 2), an exemplary embodiment of an angular filter portion 250 and a detector array 230. The exemplary angular filter portion 250 includes a lens 256 with a focal length f, an aperture 255, and a lens 257 with a focal length f. The OPA element 220 may be provided as an optical fiber bundle formed from a group of optical fibers that each operate similarly to the optical fiber 121' or 121" described above. In the embodiment shown in FIG. 2, the optical fiber bundle is a densely packed fiber bundle comprising a set of optical fibers having parallel axes and input ends and output ends that form planes approximately perpendicular to the fiber axes.

In various exemplary embodiments, the target member 210 includes or gives rise to a plurality of dark spots on a light background. In another embodiment, the target member 210 includes or gives rise to a plurality of light spots on a dark background. In either case, the spots operate as target points in a manner analogous to the previously described point 115. The target point 215 shown in FIG. 2 represents one such spot.

As shown in FIG. 2, light rays from the target point 215 are received by an operable ring or circle of optical fiber input ends, where the size of the ring is $2a$, and depends on the distance between the fiber bundle and the target point 215. In general, all of the optical fibers of the fiber bundle that forms the OPA element 220 receive light from a range of points on the surface of the target member 210. However, as outlined above and described further below, in the exemplary embodiment shown in FIG. 2, the angular filter portion 250 is arranged such that the detector array 230 only sees light rays that exit the fiber bundle that forms the OPA element 220 at the angle α from the fiber surface normal and parallel to an optical axis 258 of the angular filter portion 250. Thus, only such operable light rays are emphasized in FIG. 2.

The hypothetical plane 245 is defined in the same manner as previously described for the hypothetical plane 145. The dimension $Z_{215}$ represents the separation of the target point 215 from the fiber bundle that forms the OPA element 220 along a direction parallel to the axes of the optical fibers. For Z>0, the operable circle of optical fibers of the size $2a$ will produce an image in the shape of an ellipse on the detector array 230. The image is in the shape of an ellipse on the detector array due to the foreshortening of the operable circle of the output ends of the operable optical fibers. The foreshortening results from the angle α between the optical axis 258 and an axis normal to the plane of the operable circle of output ends. The minor axis of the ellipse is equal to $2b$, and lies in the plane of the page in FIG. 2. The major axis lies in a plane perpendicular to the page in FIG. 2 and is equal to $2a$. The major and minor axes can be described as follows:

$$\text{major axis}=2a=2Z \tan \alpha \qquad (\text{Eq. 1})$$

$$\text{minor axis}=2b=2a \cos \alpha \qquad (\text{Eq. 2})$$

Thus, since the angle α is known by design, it should be apparent that the height Z can be determined based on the radius of the major and/or minor axis of the ellipse in an image acquired by the array detector 230. It should be appreciated form the foregoing description of operation, that in various exemplary embodiments according to this invention, the size and shape of the image arising from a point feature, such as the target point 215, does not depend on the orientation of the target member 210, only the Z-coordinate of the target point.

As previously outlined, if the target point 215 is translated ΔX along the X-axis or ΔY along Y-axis in the plane 245, the location of the center of the image of the ellipse will translate along corresponding directions on the array detector 230. In particular, for the first exemplary embodiment of a position sensor arrangement 200 shown in FIG. 2, the image translation corresponding to the X-axis will be equal to ΔX cos α due to foreshortening, and the image translation corresponding to the Y-axis will be ΔY. Thus, by these methods, a position sensor arrangement according to this invention is capable of measuring a position along 3 translational degrees of freedom, generally denoted as X, Y, and Z herein, between a target point 215 and the position sensor arrangement.

Furthermore, it should be appreciated that in various exemplary embodiments according to this invention, the dimensions of the optical fiber bundle that forms the OPA element 220 along directions perpendicular to the fiber axes are extended beyond those shown schematically in FIG. 2, and the dimensions of the angular filter portion 250 and the detector array 230 are similarly extended along directions perpendicular to the optical path 258. Thus, such embodiments are able to simultaneously image a plurality of target points having a known spacing relative to one another on the target member 210. The target point 215 and a target point 216, shown in FIG. 2, represent such points. Similar to the target point 215, the target point 216 defines a plane 245' analogous to the plane 245, and has Z-axis position corresponding to the dimension $Z_{216}$. The X, Y and Z positions of the target point 216 can also be determined as outlined above. Accordingly, based on the determined positions of the two target points 215 and 216 and their known spacing relative to one another on the target member 210, the angular orientation of the target member 210 along a line connecting the target points 215 and 216 can also be determined in two planes, according to known methods. Thus, a position sensing arrangement according to this invention is capable of measuring a position relative to a target member along 3 translational degrees of freedom such as X, Y, Z and at least one angular or rotational degree of freedom, for a scale member including at least two target points.

By analogy with the foregoing discussion, it should be appreciated that the X, Y and Z positions of one or more additional target points having a known spacing on the target member 210 can also be determined as outlined above. Accordingly, with at least three target points that have a known spacing and that define a plane on a target member such as the target member 210, a position sensing arrangement according to this invention is capable of measuring a position and orientation relative to the target member including 3 translational degrees of freedom such as X, Y, Z and three angular or rotational degrees of freedom.

It should be appreciated that the target member 210 can be any desired size and include various types of patterns that include a plurality of target points such as the target points 215 and 216. In one exemplary embodiment, the target member 210 includes an array of point features arranged according to a regular pitch along two orthogonal axes. The images arising from such a target member are discussed further below with reference to FIG. 3. In various exemplary embodiments the target member 210 is larger than a field of view of the detector array 230. The detector array is operably connected to a compatible signal processing unit, that is operable to receive the pixel data of the detector array and analyze the image features arising from the various pattern elements on the target member, as outlined above and in further detail below. In various exemplary embodiments the signal processing unit inputs and analyzes successive images of the target member 210 at a desired repetition rate or frame rate, in order to track accumulated motion of the target member 210, including motions that displace the target member 210 beyond one pitch increment and/or beyond one "field of view" increment along either or both directions of a two dimensional array of features arranged on the target member 210. In such as case, the known pitch or spacing of the target elements on the target member 210 provide a scale usable to accurately determine the total relative displacement between a position sensing arrangement according to this invention and the target member.

One method of tracking accumulated motion along directions that lie in an X-Y plane perpendicular to the fiber axes is an image correlation method. Various applicable correlation methods are disclosed in U.S. Pat. No. 6,642,506, to Nahum, and U.S. patent application Ser. Nos. 09/9876,162, 09/987,986, 09/860,636, 09/921,889, 09/731,671, and 09/921,711, which are incorporated herein by reference in their entirety.

It should be appreciated that a position sensing arrangement according to this invention may be designed or optimized to determine a desired range of positions along the Z-axis direction, that is, along a direction parallel to the fiber axes. Of course the Z-range cannot extend beyond the position where the position sensing arrangement contacts the target member. This defines $Z_{minimum}$ of the Z-range in various exemplary embodiments. In various exemplary embodiments, the signal processing related to analyzing the target element images to determine their respective Z-coordinates is simplified if the images of the various target elements do not overlap on the detector array 230. Thus, in such embodiments the minimum spacing or pitch of the target elements on the target member 210 is chosen in light of the desired $Z_{maximum}$ of the Z-range and the operable polar angle α, according to the relation:

$$\text{minimum spacing} > 2 * Z_{minimum} * \tan \alpha \quad \text{(Eq. 3)}$$

In various other exemplary embodiments, a minimum spacing is less than a value satisfying this relation and more complicated image processing is used to determine the Z-coordinates of the various target elements even though their respective target element images overlap in the image detected by the detector array 230.

Regarding the fiber bundle that forms the OPA element 220, in various exemplary embodiments the fiber bundle includes fibers that are arranged in a densely packed or close packed arrangement. In various exemplary embodiments the fiber axes are at least approximately parallel. In various exemplary embodiments image analysis results in the best accuracy and/or repeatability when the individual fibers are at least approximately cylindrical. It should be appreciated that various fiber close-packing fabrication methods and/or fiber drawing operations or the like can introduce fiber cross-section distortions (that is, non-cylindrical fibers.) When the fibers are distorted, for example into an ellipse or a hexagonal cross-section, or the like, the operable light cone output by the fiber exhibits various distortions and/or uneven intensity distributions, which potentially introduce errors into the various image processing methods used to the determine the Z-coordinates of the target elements and/or otherwise complicate the required signal processing. Nevertheless, such fibers may be used in various other exemplary embodiments that sacrifice some accuracy in order to use more economical components. In various exemplary embodiments, the individual fiber diameter is chosen such the fiber diameter images to a dimension that is smaller than one pixel on the array detector 230. In one exemplary embodiment that provides very accurate measurements, the fiber diameter is approximately 6 µm. In various other exemplary embodiments, the fiber diameter is selected in a range from 3 µm to 80 µm, or more. However, this example is illustrative only, and not limiting. Larger diameter fibers are used in various other exemplary embodiments that sacrifice some accuracy and/or resolution in order to use more economical components. In such lower-accuracy embodiments, a larger diameter may be used, up to 200 µm or more.

Regarding the angular filter portion 250, in the exemplary embodiment shown in FIG. 2, the angular filter portion 250 includes two lenses and an aperture arranged in a doubly telecentric arrangement that provides no magnification or reduction of the image provided at the output ends of the fiber bundle that forms the OPA element 220. Although the lenses 256 and 257 are shown as singly convex lenses in the embodiment shown in FIG. 2, it should be appreciated that other lens configurations, such as biconvex lenses or any other lens that is operable according to this invention, may be used.

As is generally known to one of ordinary skill in the art, a telecentric arrangement generally transmits only light rays that are approximately parallel to the optical axis 258 of the telecentric arrangement. Thus the arrangement and/or orientation angle of the angular filter portion 250 relative to the fiber bundle that forms the OPA element 220 defines the operable angle α. Also, as generally known, a telecentric arrangement provides a magnification, a 1:1 magnification in the embodiment shown in FIG. 2, that is at least approximately independent of the distance from the object plane(s) to the telecentric arrangement. The doubly telecentric arrangement shown in FIG. 2 also provides an image magnification, a 1:1 magnification in the embodiment shown in FIG. 2, that is also independent of the distance from the telecentric arrangement to the image plane, that is, the plane of the array detector 230.

However, in various other exemplary embodiments, the lens 257 is eliminated from the angular filter portion 250, and the array detector 230 is fixedly mounted relative to the aperture 255 and the lens 256, in place of the lens 257 at the distance f from the aperture 255. This configuration also provides an image magnification of 1:1. In various other exemplary embodiments, the camera is mounted at another distance from the aperture 255, in order to provide a desired magnification or reduction other than 1:1.

In the foregoing embodiments, in addition to its role in the telecentric arrangement, the focusing characteristic of the lens 256 provides an advantage, in that it focuses or concentrates the light passing through the aperture 255 to provide higher image intensity at the detector array 230. In the absence of the lens 256, the angular filter portion 250 has the disadvantages that it is not telecentric, and furthermore the aperture 255 filters out more of the total light available from the OPA element 220. Nevertheless, an angular filter portion 250 that includes only the aperture 255 is still usable in various exemplary embodiments according to this invention that sacrifice some accuracy and/or image processing simplicity in order to use more economical components. However, such embodiments will suffer low image intensity, and a decreased S/N ratio at the array detector 230. Furthermore, such embodiments will generally require more complicated image processing in order to determine the Z-coordinates of the various target elements on the target member 210, because each portion of the image on the array detector 230 will have a different effective magnification in the absence of a telecentric arrangement in the angular filter portion 250.

Also shown in FIG. 2 is a dimension W, which is the nominal width of the "image line" that forms the previously described ellipse, or the like, that arises at the array detector due to a target point on the target member 210. In various exemplary embodiments according to this invention, the width W is determined by the effective individual fiber apertures and/or the size of the aperture 255 and/or the focusing effects of the lens 256 and/or the lens 257. It should be appreciated that the overall accuracy of a position sensor arrangement according to this invention, depends at least partly on the resolution with which the location of each portion of the "image line" that forms the previously described ellipse, or the like, can be determined. Thus, in various exemplary embodiments according to this invention, the nominal location of each portion of an "image line" is determined, fitted, or otherwise estimated with sub-pixel resolution, as described further below. Thus, in various exemplary embodiments, a position sensor arrangement according to this invention is designed such that the nominal width W spans at least three pixels on the array detector 230, in order to facilitate sub-pixel interpolation for locating various image features. In various other exemplary embodiments that provide higher accuracy, the nominal width W spans at fewest 3 and at most 6 pixels of the array detector 230. In other exemplary embodiments that sacrifice some accuracy and/or image processing simplicity in order to use more economical components, the width W spans less than three pixels or more than 6 pixels.

Regarding the target member 210, in various exemplary embodiments, a target point 215, or the like, is provided by a pinhole feature in a layer of a target member 210 that is otherwise opaque, except for similar pinholes or other desired pattern elements on the target member 210. In such embodiments, the target member 210 includes a light source arranged to transmit light through the various pinhole features. In various other exemplary embodiments, a similar image effect is achieved by a target point 215 that is a "reflective pinhole" in a layer of a target member 210 that is otherwise non-reflective, except for similar reflective pinholes or other desired pattern elements on the target member 210.

In one such embodiment, the target member 210 is diffusely lit from the upper side of the target member 210 that faces the position sensor arrangement and the reflective pinhole features comprise miniature corners cubes applied to, embedded in, or formed in the target member 210. Such corner cubes may have dimensions as small as 10 microns or less in various exemplary embodiments, and may be formed by various known embossing and/or deposition methods in various exemplary embodiments. A target made of corner cubes is very effective at efficiently coupling light back to the readhead at the correct angle for detection. The target features, however, could also be a diffusing material, such that light striking them is sent in all directions. The portion of the target that is in between these features would in one embodiment be a light absorbing material such as resist or black chrome. A material similar to 3M Diamond Grade Reflective sheeting (available through 3M Corporate Headquarters, 3M Center, St. Paul, Minn., USA), which is an array of corner cubes, can be the starting material for such a target, with portions covered with resist that are not to be reflecting. For this target, in one embodiment the corner cube dimensions are on the order of a few microns.

It should be appreciated that in various other exemplary embodiments, the target point 215 can be provided by a "reverse pinhole" feature in a layer of a target member 210 that is otherwise diffusely and highly reflective, except for similar reverse pinholes or other desired pattern elements on the target member 210. Again, a material similar to 3M Diamond Grade Reflective sheeting can be the starting material for such a target. In such embodiments, the target member 210 is lit from the upper side of the target member 210 that faces the position sensor arrangement and diffusely reflects the light everywhere except for the various reverse pinhole features, that provide no reflected light. It should be appreciated that the operation of the light rays arising from a target point according to this invention, as described in various exemplary embodiments described previously, or further below, is in this case provided by a "negative image", compared to the foregoing descriptions. That is, the previously described light paths and light cones are in this case "dark paths" and "dark cones", and the image of the target point is in this case a "dark portion" of the image amidst a lighted background. It is apparent that such "reverse image" operation provides an alternative embodiment for the position sensor arrangement 200, as well as various other position sensing arrangements according to this invention.

Although the target member 210 is generally illustrated as a separate element herein, it should be appreciated that in various exemplary embodiments, the target member 210 may comprise a surface of a machine part or movable stage, or the like, which includes target features that are usable according to this invention. Furthermore, although the target features are generally illustrated and described as points herein (because such points are compatible with one of the simplest image processing schemes for determining the size and position of an image feature corresponding to a target feature), more generally the target features can be any shape that gives rise to an image feature that has a size and position which can be determined by a practical image processing scheme, for example by image processing scheme that includes a transform, or a convolution, or the like. These and various other target member alternatives will be apparent to, and understood by, one of ordinary skill in the art, having the benefit of this disclosure.

In one exemplary embodiment, the optical components of the angular filter portion 250 are selected and arranged such that the dimension f shown in FIG. 2 is approximately 20 mm, the angle α is approximately 15 degrees, and the aperture 255 has a diameter of approximately 0.5 mm. The fiber bundle that forms the OPA element 220 has a dimension L parallel to the optical fiber axes that is approximately 10 mm, dimensions along the x and y axes that are approximately 12 mm, and the optical fiber diameter d is approximately 6 μm. The target points have a dimension of approximately 100 μm, and are spaced apart by a pitch of 1.0 mm along two orthogonal axes on the target member 210. The array detector 230 is approximately 4.7 mm by 3.5 mm, and includes 640 columns and 480 rows of pixels arranged at a pitch of approximately 7.4 μm along the orthogonal row and column directions. The target member nominal operating separation from the bottom plane, or reference plane, of the fiber bundle that forms the OPA element 220 is approximately 1.0 mm +/−0.5 mm. With suitable image processing, as outlined further below, such a configuration can provide a resolution and accuracy of approximately 1–2 μm for X, Y and Z translations, and approximately 0.05 degrees for roll, pitch and yaw angles. Using a suitable array detector and DSP, 6D measurements can be provided at a sample rates of up to 1000 Hz or more, in various exemplary embodiments.

It should be appreciated that the parameters and elements of the foregoing specific exemplary embodiment are illustrative only, and not limiting. Numerous other operable embodiments are possible, and will be apparent to one of ordinary skill in the art, having the benefit of this disclosure.

FIGS. 3A–3F are diagrams illustrating one exemplary pattern of target points included on a target member according to this invention and various resulting patterns of idealized ring-shaped images of the target points that are formed at a detector array such as the detector array 230, also referred to as a camera herein, for various orientations of the target member in various exemplary embodiments according to this invention. As described above with reference to FIGS. 1 and 2, a target point on the target member will produce an image that is ring-shaped at the camera. As previously outlined, the ring-shape is elliptical in various embodiments according to this invention. However, for values of the operable angle α less than approximately 25 degrees, the minor axis of the ellipse is at least 90% as large as the major axis, and can be approximated by a circle for purposes of illustration. In general, the dimension(s) of each respective ring image depend on the operable angle α and the Z-coordinate between a reference plane of an OPA element and the corresponding respective target point. When the arrangement of the angular filter portion and the camera provide a magnification of 1:1, the dimensions of the ring are given by EQUATIONS 1 and 2. FIG. 3A shows an array of target points 300A which may be used as a target pattern on the target member. The target points are arranged according to a periodic pitch Px along an X-axis direction of the target member, and a periodic pitch Py along a Y-axis direction of the target member, in the embodiment shown FIG. 3A. This is also the image on the camera when the reference plane of an OPA element is approximately parallel and in contact with the target member.

FIG. 3B shows an array of rings 300B that is formed at the camera when the reference plane of an OPA element is approximately parallel with the plane of the target member and at some separation from along the Z-axis. FIG. 3C shows an array of rings 300C in which the plane of the target member is rotated with respect to the reference plane of an OPA element about the Y-axis, and the Z-axis separation of the right-most target points from the OPA element is greater than the separation of the left-most target points. FIG. 3D shows an array of rings 300D that result when the target member has been tilted in the opposite direction from that of FIG. 3C. FIG. 3E shows an array of rings 300E which results when the plane of the target member is rotated with respect to the reference plane of an OPA element about the X-axis, and the Z-axis separation of the top-most target points from the OPA element is greater than the bottom-most target points. FIG. 3F shows an array of rings 300F that result when the plane of the target member is rotated with respect to the reference plane of an OPA element about an axis parallel to the X-Y plane and at an angle of approximately 45 degrees counterclockwise from the X-axis. The separation of the upper left-most target points from the OPA element is greater than the bottom right-most target points.

In terms of the coordinate system shown and/or implied in FIGS. 2 and 3, the spacing between the centers of the ring images will decrease along the X-axis direction according to the cosine of the rotational angle component about the Y-axis. Similarly, the spacing between the centers of the rings will decrease along the Y-axis direction according to the cosine of the rotational angle component about the X-axis. However, it should be appreciated that the spacing between the centers of the rings is a rather weak indicator of the relative rotation, particularly for small rotation angles. Rather, it should be appreciated that a particularly strong feature of this invention is that the sizes of respective rings are a very sensitive indicator of the Z-coordinates of their corresponding respective target points. Thus, the various angular components of the rotation of the scale member relative to the position sensor are determined to a high degree of accuracy from these respective Z-coordinates and their associated X and Y coordinates, in various exemplary embodiments according to this invention.

One exemplary method of determining the translational and rotational components of the position of a position sensor arrangement according to the present invention relative to a target member will be described in more detail below with respect to FIGS. 5 and 6.

FIGS. 4A and 4B are schematic diagrams illustrating a position sensor arrangement 300 according to this invention, which is similar or identical to the generic position sensor arrangement 200 along with an exemplary set of coordinate relations for indicating the location of various ring images arising from a target point. It should be appreciated that the relationships between various dimensions in FIGS. 4A and 4B are not shown to scale, but are exaggerated wherever it is useful for purpose of illustration.

The position sensor arrangement 300 includes a target member 310 including a representative target point 315 and a readhead 390. The readhead 390 comprises an OPA element 320 according to this invention that has an image light input face 322 and an image light output face 323, a symbolically represented angular filter portion 350 and a camera 330. In the embodiment shown in FIGS. 4A and 4B, the OPA element 320 comprises a fiber bundle OPA, but the description of operation with reference to FIGS. 4A and 4B is not so limited. Any operational OPA may be used, for example the axicon-type OPA described below with reference to FIGS. 16–20. The elements numbered 3XX operate in a manner analogous or identical to the elements similarly numbered 2XX, previously described with reference to FIG. 2. It should be appreciated that to simplify the more important aspects of the explanation of the position determination, dimensions along the direction of the optical axis 358 of the angular filter portion 350 are compressed in the schematic illustration of FIG. 4A. It is assumed that the angular filter portion 350 provides a 1:1 magnification. Furthermore, the light rays output from the angular filter portion 350 are shown schematically on the same side of the optical axis 358 as the corresponding input light rays, ignoring the image reversal shown in the more detailed embodiment shown in FIG. 2. However, it should be appreciated that an image reversal may be treated with a sign reversal for the various image feature camera coordinates, or alternatively, with a sign reversal for the various position components determined according to this simplified description of the position determination. Therefore, it should be appreciated that FIGS. 4A and 4B are intended to illustrate this position determination method conceptually and schematically, and ignore reversal of image position across the optical axis relative to the object position that occurs due to the operation angular filter portion in various exemplary embodiments according to this invention. However, based on this clarification and explanation, any necessary modifications to the following position determinations methods that are required in a particular embodiment according to this invention will be readily apparent to one of ordinary skill in the art.

FIG. 4A is a view looking along the Y-axis direction of the position sensor arrangement 300. FIG. 4B is a view looking along the X-axis direction of the position sensor arrangement 300. In the following description of a position determination for the position sensor arrangement 300, in concept, the camera coordinate locations of various image features are determined and then the corresponding light rays are traced backwards, from the camera to a target point 315 through various coordinate transformations, to determine the location of a respective target point 315 on the target member 310 with respect to a reference point on a reference plane of the OPA element 320. The reference point O is a point on a reference plane of the OPA element 320, that corresponds to the point O' where the optical axis 358 intersects with the operable output plane of the image light from the OPA element reference 320. In this exemplary embodiment, the center of the camera 330 is the camera coordinates origin O'', and is also aligned with the optical axis 358. Knowing the location of three individual target points such as the target point 315 leads to a calculation of location and orientation of the readhead 390 relative to the target member 310.

In order to calculate the relative location and orientation of the OPA element reference 320 with respect to the target member 310, the first step is to find the nominal location and size of the rings on the OPA element reference surface (which is the bottom plane of the fiber bundle that forms the OPA element 320 in the embodiment shown in FIG. 4A) based on their image sizes and locations, then find the location of the target point(s) 315 that produce the rings, then find the relative translational and rotational position of the target member 310 or readhead 390 that is consistent with those locations.

In various exemplary embodiments according to this invention, an image processing fitting routine is applied to the images of the rings on the camera, in order to accurately determine their size and location in terms of the camera coordinates. In various exemplary embodiments, the fitting routine that is applied during the image processing assumes that the rings are circles, and the resulting fitted or estimated radii of the various ring images on the camera $R_{ic}$, where i is an integer that designates a particular one of the rings, are then approximately equal to the average of the major and minor axes of the rings.

$$R_{ic} = \frac{a_i + b_i}{2} \quad \text{(Eq. 4)}$$

In various exemplary embodiments, the operable angle α is designed such that the rings are nearly circular, so this is a good approximation, although higher accuracy may be achieved with an ellipse fitting routine rather than a circle fitting routine in various exemplary embodiments. The radius of a ring at the OPA element reference surface is estimated as;

$$R_{if} = a_i = \frac{2 \cdot R_{ic}}{1 + \cos\alpha} \quad \text{(Eq. 5)}$$

The x- and y-position coordinates of the ring centers at the OPA element reference surface, which are the same as the x- and y-coordinates of the ith target point for the embodiment shown in FIGS. 4A and 4B, are given below.

$$x_i = \frac{p_i}{\cos\alpha} \quad \text{(Eq. 6a)}$$

$$y_i = q_i \quad \text{(Eq. 6b)}$$

The z-position coordinate $Z_i$ of the ith target point is calculated from the following equation:

$$z_i = R_{ij} \cdot \cot\alpha \quad \text{(Eq. 7)}$$

It should be appreciated that the illustration shown in FIGS. 4A and 4B is schematic, as previously discussed, and shows only one target point, for purposes of explanation. However, in various exemplary embodiments, at least three target points such as the target point 315 fall within the field of view of the camera 330 at all times. Thus, a unit vector that is normal to the target member 310 can be found from three such target points that lie on the target member 310. The cross-product of two vectors defined by the positions of three such target points produces a vector perpendicular to the target surface, which can be used to determine various relative rotation components according to various well known methods of vector algebra and/or as outlined below.

Figure 5:
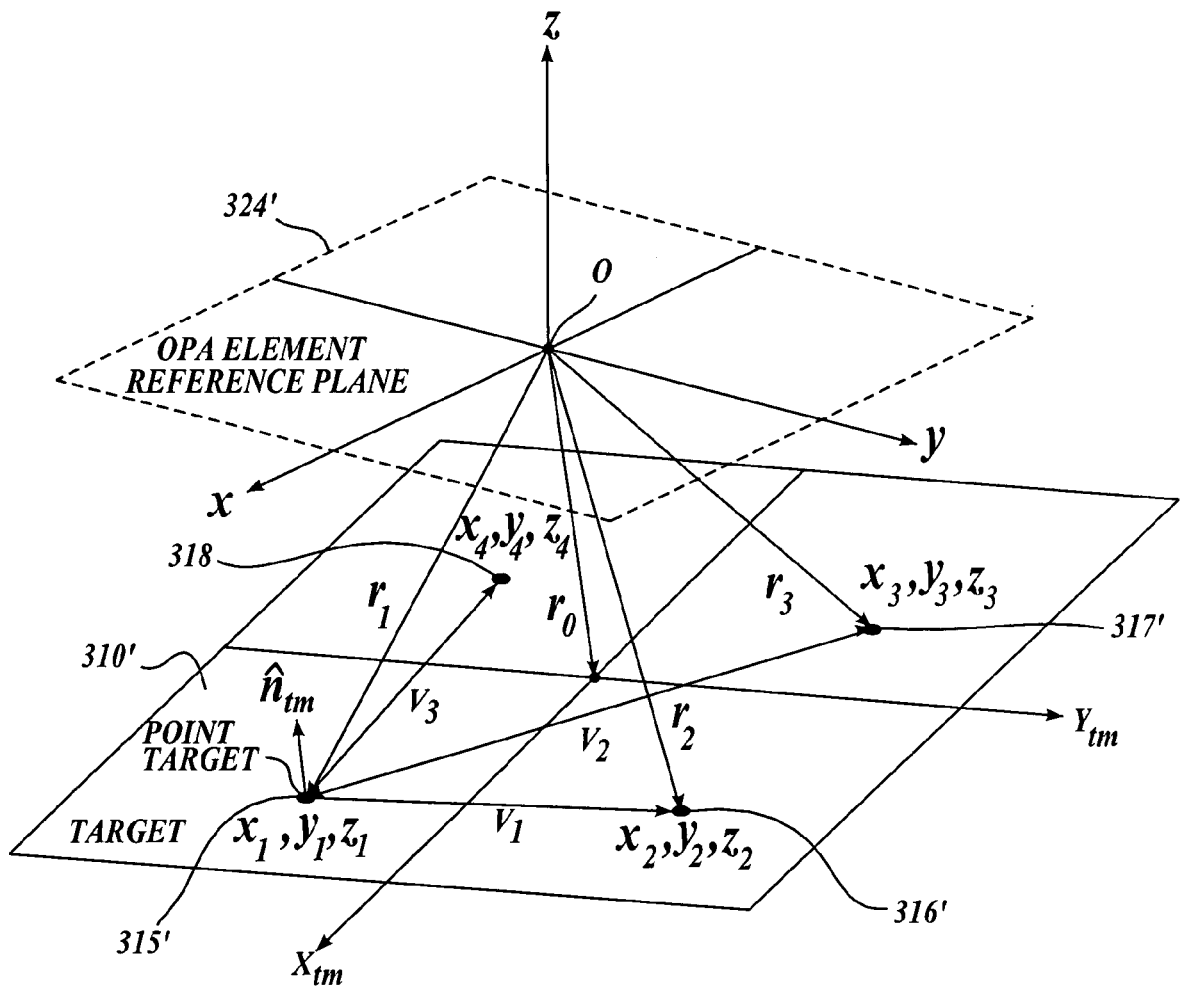
FIG. 5 is a diagram illustrating a reference plane of a position sensor according to this invention, and a target plane, and a first exemplary set of various related position vectors.

As shown in FIG. 5, the vectors $r_i$ connect the coordinate origin O on the OPA element reference plane 324' to the target points 315'–317' on the target plane. The vectors $v_i$ lie in the plane of the target member 310'. The vector $r_0$ is defined as a vector normal to the target member 310' that runs through the coordinate origin O. A unit vector $n_{tm}$ that is normal to the plane of the target member 310' is constructed from the cross-product of two vectors $v_i$ that lie in the target member plane. For the example shown in FIG. 5:

$$\hat{n}_{tm} = \frac{v_1 \times v_2}{|v_1 \times v_2|}; \text{ where } v_i = r_{i+1} - r_1 \quad \text{(Eq. 8)}$$

It should be appreciated that the unit vector $n_{tm}$ in EQUATION 8 describes the tilt of the target member 310' relative to the Z-axis defined by the direction normal to the OPA element reference plane 324', which can be used to determine the relative angular orientation of the target member 310' and a readhead according to this invention, about two orthogonal reference axes, according to known methods of vector algebra.

The $x_{tm}$- and $y_{tm}$-directions of the local x and y reference axes of the target member 310' may be defined to coincide with a pattern of target points arranged periodically along orthogonal axes on the target member 310'. For example, in various exemplary embodiments, the target points are arranged in a periodic row and column pattern having a distance between the target points in the $x_{tm}$-direction and $y_{tm}$-direction equal to the same periodic pitch P (that is, Px=Py=P). In various exemplary embodiments, the initial orientation of the $x_{tm}$-direction and $y_{tm}$-direction about the Z-axis is known, and the relative rotation of the target member 310' about the Z-axis is limited to less than +/−45 degrees (or somewhat less, considering the possible effects of tilt about the X and Y axes), or is tracked by a process that accumulates the net rotation about the Z-axis over time. Thus, the approximate directions of the $x_{tm}$ and $y_{tm}$ axes about the Z-axis are unambiguous. Accordingly, to define vectors along the $x_{tm}$- or $y_{tm}$-directions (assuming that tilt relative to the X and Y axes is relatively limited, as is the case for most or all practical applications), in the worst case it suffices to start from the coordinates of a selected target point, for example the target point closest to the coordinate origin O, and identify 2 target points that are closest to that one, and to each other. When the relative rotation in the X-Y plane between the target member 310' and a readhead, the readhead 390 for example, is limited to less than +/−45 degrees, or tracked, the direction of the respective vectors connecting the initially selected target point with these two target points will clearly identify the $x_{tm}$-direction and the $y_{tm}$-directions. For increased angular accuracy, longer vectors to target points farther along these directions may be determined.

Thus, in various exemplary embodiments, defining either of the vectors described above as v (vectors v1 or v3 in FIG. 5), unit vectors that correspond to the $x_{tm}$-direction and $y_{tm}$-directions are:

$$\hat{x}_{tm} = \frac{v}{|v|} \left( \text{or } \hat{y}_{tm} = \frac{v}{|v|} \right) \quad \text{(Eq. 9)}$$

The unit vector along the $z_{tm}$-direction is the same as the unit vector $n_{tm}$ given by EQUATION 8, or is alternatively found from the cross-product:

$$\hat{z}_{tm} = \hat{x}_{tm} \times \hat{y}_{tm} \quad \text{(Eq. 10)}$$

In various exemplary embodiments, in order to determine relative orientation and fully define a 6D measurement of relative position and orientation, a rotation matrix R is formed from the unit vectors according to well know methods of vector algebra:

$$R = \begin{pmatrix} \hat{x}_{tm} \\ \hat{y}_{tm} \\ \hat{z}_{tm} \end{pmatrix} = \begin{pmatrix} x_{tm,x} & y_{tm,x} & z_{tm,x} \\ x_{tm,y} & y_{tm,y} & z_{tm,y} \\ x_{tm,z} & y_{tm,z} & z_{tm,z} \end{pmatrix} \quad \text{(Eq. 11)}$$

where the component $x_{tm},x$ of the unit vector $x_{tm}$ component is along the readhead coordinate system X-axis, and so on for the other subscripted vector components. The rotation matrix is also described by roll, pitch, and yaw rotations applied to the target member in the readhead coordinate system, according to known methods of vector algebra. Here it is assumed that the rotations are applied in the following sequence: first roll ($\theta_r$ about the X-axis), then pitch ($\theta_p$ about the Y-axis), then yaw ($\theta_y$ about the Z-axis).

$$R = \begin{pmatrix} \cos\theta_y\cos\theta_p & \cos\theta_y\sin\theta_p\sin\theta_r + \sin\theta_y\cos\theta_r & -\cos\theta_y\sin\theta_p\cos\theta_r + \sin\theta_y\sin\theta_r \\ -\sin\theta_y\cos\theta_p & \cos\theta_y\cos\theta_r - \sin\theta_y\sin\theta_p\sin\theta_r & \cos\theta_y\sin\theta_r + \sin\theta_y\sin\theta_p\cos\theta_r \\ \sin\theta_p & -\cos\theta_p\sin\theta_r & \cos\theta_p\cos\theta_r \end{pmatrix} \quad \text{(Eq. 12)}$$

The various rotation angles can be found by equating the two matrices.

$$\theta_p = \theta_{pitch} = \sin^{-1}(x_{tm,z}) \quad \text{(Eq. 13)}$$

$$\theta_r = \theta_{roll} = \sin^{-1}(y_{tm,z}/\cos(\theta_{pitch})) \quad \text{(Eq. 14)}$$

$$\theta_y = \theta_{yaw} = \sin^{-1}(x_{tm,y}/\cos(\theta_{pitch})) \quad \text{(Eq. 15)}$$

Alternatively, the rotation of the readhead relative to the various axes $x_{tm}$, $y_{tm}$, and $z_{tm}$ of the target member may be determined by analogous methods of vector algebra or by known vector algebra transformations of the results indicated above.

In various exemplary embodiments, the translational position of the readhead compared to the target member may be determined as follows: The point $O_{tm}$ shown in FIG. 6 is defined as the current origin of the local axes of the target member. A vector that is parallel to the target normal $n_{tm}$, or to $z_{tm}$, between the origin O and a point that lies on the target plane defines the point $O_{tm}$. As shown in FIG. 6, this is the vector $r_0$, aligned along the $z_{tm}$ axis of the target plane and connecting the two points (O and $O_{tm}$). The z-coordinate of the readhead, or "gap" is defined as the length of the vector $r_0$. The current local $x_{tm}$- and $y_{tm}$-coordinates of the readhead relative to the target member will be referenced to the current target member origin point $O_{tm}$.

It should be appreciated that the 3 rotational components and the z-coordinate translational component or gap can be determined absolutely from any single target member image, as outlined above, using a position sensor arrangement according to this invention. However, it should be appreciated that the total displacements of the readhead with respect to the target member along $x_{tm}$- and $y_{tm}$-directions are not absolute quantities, but must be determined by a process that includes tracking accumulated increments of the target point pattern pitch along the $x_{tm}$- and $y_{tm}$-directions during relative $x_{tm}$- and $y_{tm}$-translation, by methods or algorithms that will be apparent to one of ordinary skill in the art. In addition, for accurate measurements, it is necessary to add to the accumulated $x_{tm}$- and $y_{tm}$-increments the initial position within the initial $x_{tm}$- and $y_{tm}$-periods of the target point pattern, and the final position in the final $x_{tm}$- and $y_{tm}$-periods of the target point pattern, in a manner analogous to well known methods used with 1D and 2D incremental optical encoders.

Figure 6:
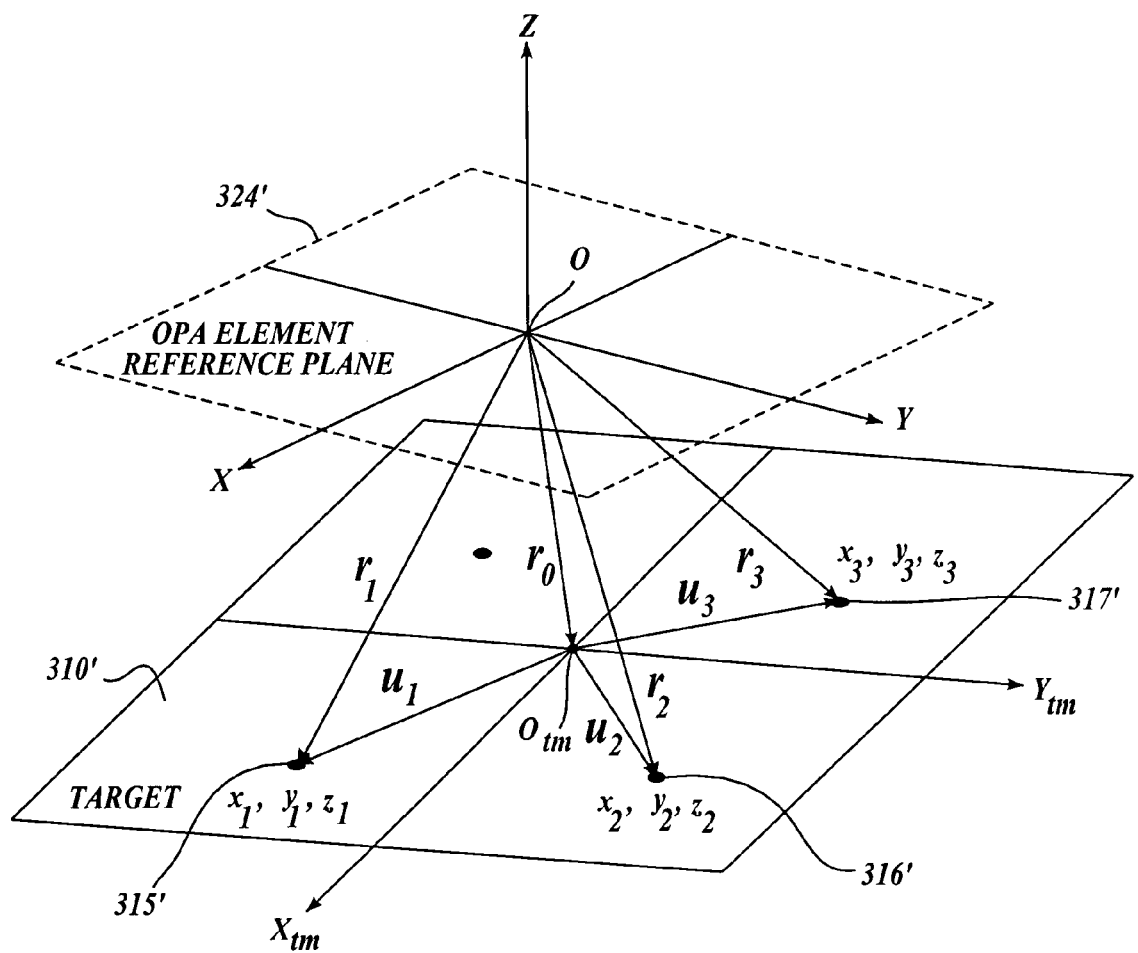
FIG. 6 is a diagram illustrating the reference plane of a position sensor according to this invention, and the target plane, and a second exemplary set of various related position vectors.

To determine a position within the current $x_{tm}$- and $y_{tm}$-periods of the target point pattern, the point $O_{tm}$ is defined by the vector $r_0$, which is determined according to well known methods of vector algebra:

$$r_0 = \hat{z}_{tm} \cdot r_i \hat{z}_{tm} \quad \text{(Eq. 16)}$$

where the vector $r_i$ can correspond to the known readhead-frame coordinates of a target point, such as any of the target points 315'–317' shown in FIG. 6.

The gap or Z coordinate is equal to the length of $r_0$.

$$gap = |r_0| \quad \text{(Eq. 17)}$$

At an initial readhead position within any current $x_{tm}$- and $y_{tm}$-period, the position vector lying in the target plane between the readhead $x_{tm}$- and $y_{tm}$-position, which coincides with point $O_{tm}$, and any one or more target points that are nearby in the target image, may be determined as:

$$u_i = r_i - r_0 \quad \text{(Eq.18)}$$

To determine the coordinates of the readhead in terms of the current target member coordinates:

$$x_i = u_i \cdot \hat{x}_{tm} \quad \text{(Eq. 19)}$$

$$y_i = u_i \cdot \hat{y}_{tm} \quad \text{(Eq. 20)}$$

where $x_i$ and $y_i$ are the current local displacements of the readhead from the nearby target point corresponding to the particular position vector $u_i$ used in EQUATIONS 19 and 20, along the current $x_{tm}$- and $y_{tm}$-axes.

As previously described, it is possible and necessary to track the accumulated increments of the $x_{tm}$- and $y_{tm}$-pitch of the target point pattern between an initial or reference position and a current or final position. Thus, the accumulated increments between the reference target point used for an initial position determined according to EQUATIONS 18–20, and the reference target point used for a final position determined according to EQUATIONS 18–20, are known or can be determined. Thus, the current x-y position (that is, the accumulated x-y displacement) of the readhead relative to the scale member can be determined accordingly.

The foregoing procedures outline one exemplary set of procedures for determining the coordinates of various target points, and the 6D relative position between a scale member and a readhead according to this invention. It should be appreciated from the foregoing procedures that, more generally, given the determination of the coordinates of 3 target points relative to a readhead according to this invention, any 1D to 6D relative position measurement between the scale member and the readhead according to this invention can be determined with reference to any coordinate frame that is appropriate or convenient for a particular measuring application. Any alternative mathematical method and/or signal processing may be used that is appropriate or convenient in a particular application.

For example, in various motion control applications, it may be convenient to roughly determine various accumulated displacements based on stepper motor control signals or the like. In such a case, yaw rotations and incremental target pattern pitch accumulations need not be restricted or tracked, and it may sufficient to simply determine various current local positions as outlined above, in order to refine the rough displacement determinations based on the stepper motor control signals, or the like, to a higher accuracy level. Furthermore, it should be appreciated that for any particular target member image, various combinations of target points may be used to provide redundant measurements, which may be averaged to enhance the measurement accuracy in various exemplary embodiments according to this invention. Accordingly, the foregoing exemplary procedures are illustrative only, and not limiting.

Figure 7A:
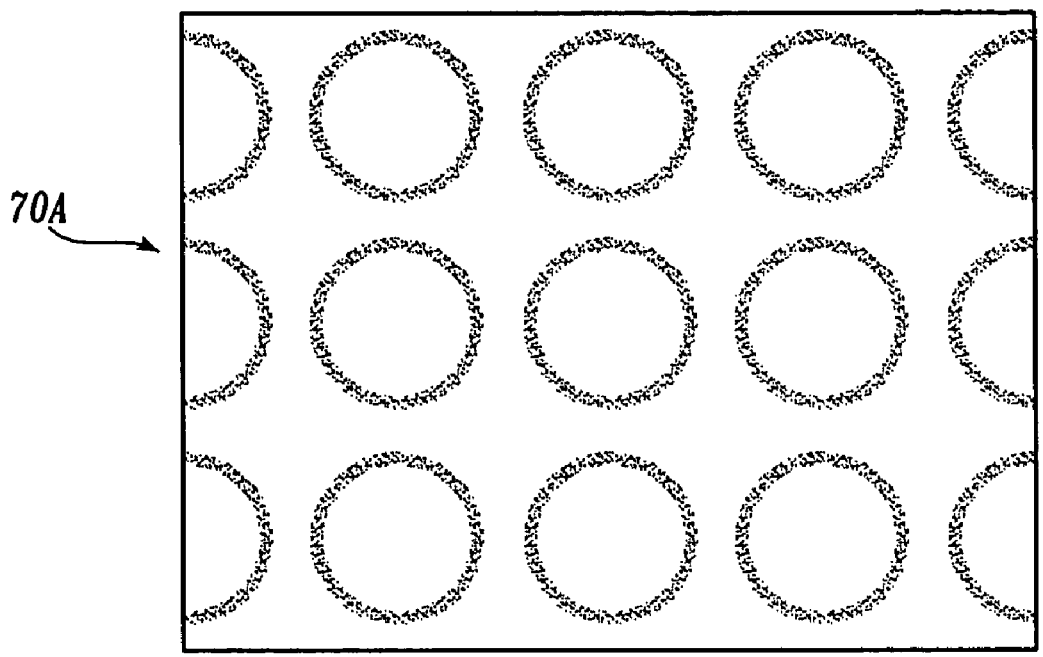
FIGS. 7A and 7B depict first and second exemplary images provided according to this invention.
Figure 7B:
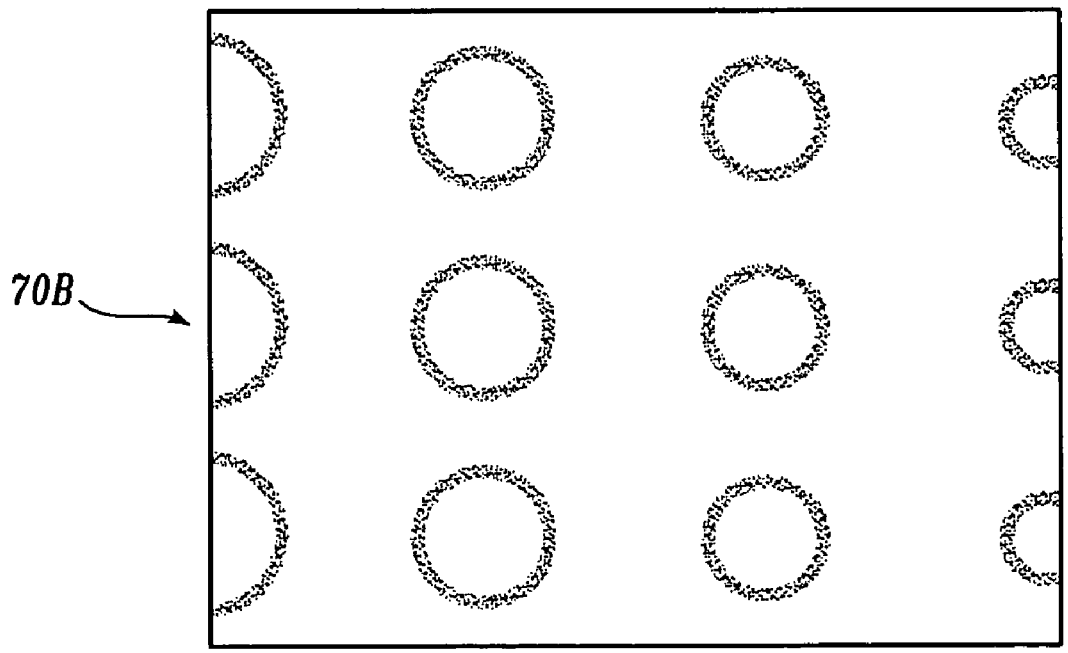

The previous discussions have not considered in detail the blur of the target point features in an image provided according to this invention. FIG. 7A shows a first exemplary image 70A provided according to this invention that includes a realistic amount of blur for the ring-shaped target point image features, for a first, relatively larger, gap dimension. FIG. 7B shows a second exemplary image 70B provided according to this invention that includes a realistic amount of blur for the ring-shaped target point image features, for a second, relatively smaller, gap dimension and a relative tilt between the readhead and target member. It should be appreciated that the blur and intensity of each individual ring shaped image feature varies with the actual z coordinate of the corresponding individual target point. FIGS. 7A and 7B show images produced by dark target points in a light background.

FIG. 8 depicts a third exemplary image 800-A that is provided according to this invention and that includes a realistic amount of blur. The image 800-A is produced by light target points in a dark background. FIG. 8 also depicts results obtained from one exemplary set of image processing operations usable to identify various target feature characteristics in a measurement image according to this invention, as demonstrated on the image 800-A.

The pseudo-image 800-B1 is produced by determining an intensity threshold, for example an intensity value between the peaks of a bimodal intensity distribution determined from the image 800-A, and assigning all pixels having intensities below the threshold a value of zero, and all other pixels a value of one. The pseudo-image 800-B2 shows a close-up of one of the ring-shaped features that results from applying a filter to smooth the boundaries in the pseudo-image 800-B 1. For example the filter may comprise setting each pixel value to the value of the majority of its 8-connected neighbors. The pseudo-image 800-B3 shows a close-up of the ring-shaped feature of the pseudo-image 800-B3 that results from applying a further boundary smoothing operation. For example, the further smoothing operation may comprise a first dilation operation wherein each pixel is assigned the value corresponding to the maximum pixel value (1, for a binary image) in its 8-connected neighborhood, followed by a second erosion operation wherein each pixel is assigned the value corresponding to the minimum pixel value (0, for a binary image) in its 8-connected neighborhood.

The pseudo-image 800-B4 shows a pseudo-image of the result obtained by retaining only an approximately single-pixel-wide track at the inner and outer boundaries of all ring shaped image features processed similarly to the ring shown in the close-up view 800-B3. In one exemplary embodiment, a first connectivity analysis is performed to identify the pixels corresponding to each individual ring shaped image feature. For example, in one exemplary embodiment, starting a set from any one-valued pixel, each neighboring one-valued pixel is added to the set. Then each of the one-valued neighbors of each of the added pixels is added to the set, and so on, until there are no new one-valued neighbors to add. Then that set of pixels is labeled as an individual ring shaped image feature. The process is repeated until all desired ring shaped image features are identified and labeled. Each ring shaped image feature is "labeled" or identified so that the appropriate pixels are used for the fitting routine(s) to be applied later to each ring shaped object, as described further below.

Next, in various embodiments, each labeled feature is processed to determine an approximately single-pixel-wide track at its inner and outer boundaries. For example, for a labeled feature, a subset of its one-valued pixels is identified corresponding to those pixels that have a neighbor that has a value of zero. Then, a connectivity analysis is performed on the subset. Two further subsets will result: The connected pixels forming a ring at the outer boundary of that labeled feature, and the connected pixels forming a ring at the inner boundary of that labeled feature. Such labeled subsets are shown in the pseudo-image 800-B4. The darkness variations between various rings in the image 800-B4 are an insignificant artifact of the illustration technique.

The pseudo-image 800-C1 shows a close-up of the circular tracks of one of the ring-shaped features in the pseudo-image 800-B4, and the pseudo-image 800-C2 shows best-fit dashed-line circles 810 and 820 fit to the circular tracks of the ring-shaped feature of the pseudo-image 800-C1. The circular tracks of each ring shaped image in the pseudo-image 800-B4 may be similarly processed, using any now known or later developed circle fitting method. In various exemplary embodiments according to this invention, the average of the radii of the inner and outer circles is used as the radius $R_{ic}$ in EQUATION 5 and the averages of respective row and column pixel coordinates of the centers of the inner and outer circles determine the center coordinates $p_i$ and $q_i$ used to determine the coordinates $x_i$ and $y_i$ in EQUATIONS 6A and 6B. Thus, in various exemplary embodiments the (x,y,z) coordinates of a target point are determined using the corresponding fit circles resulting from the operations described above with reference to FIG. 8, or the like.

It should be appreciated that the image processing operations described above are illustrative only, and not limiting. Various operations may be eliminated, replaced by alternative operations, or performed in a different sequence, in various embodiments according to this invention.

It should be appreciated that while the foregoing image processing and coordinate determining operations are relatively fast, and provide sufficient accuracy for a number of applications, the image processing operations have suppressed a considerable amount of the information available in the original image of each ring shaped feature. It should be appreciated that the estimated coordinates of each target point can be determined with higher accuracy, or refined, by making use of this suppressed information.

Figure 9:
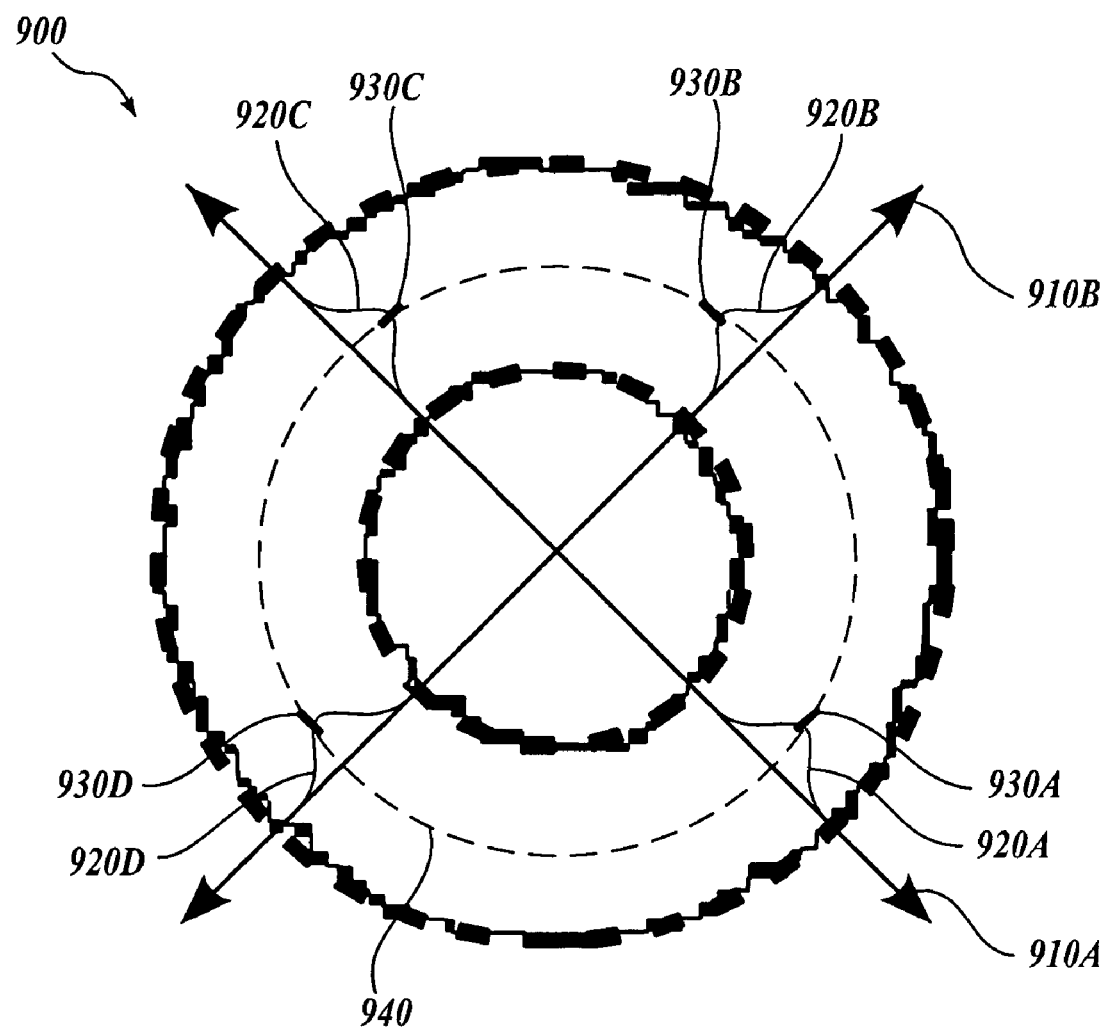
FIG. 9 shows one exemplary target feature representation similar to a result shown in FIG. 8, along with a superimposed diagram clarifying a method of determining a refined estimate of the radius and center of a circle used to determine the (x,y,z) coordinates of a corresponding target point.

FIG. 9 shows an illustration 900 of the best-fit circles 810 and 820 and the circular tracks of image 800-C2 of FIG. 8, along with a superimposed diagram clarifying one exemplary method of determining a refined estimate of the radius and center of a circle used to determine the (x,y,z) coordinates of a corresponding target point in various exemplary embodiments according to this invention.

Briefly, at least two lines 910A and 910B are drawn through the averaged center of the best-fit circles 810 and 820, such that the lines are evenly spaced over 360 degrees around the best-fit circles 810 and 820. Next the respective sets of pixels that are closest to the respective lines 910A and 910B and that lie between the best-fit circles 810 and 820 are identified. For each respective set of pixels, the corresponding intensity values in the original target member image are determined, as indicated by the respective radially-oriented intensity profiles 920A–920D. Next, the respective pixels 930A–930D corresponding to the respective peaks of each of the radially-oriented intensity profiles 920A–920D are identified by any now known or later developed method. For example, in various embodiments a curve or a specific experimentally determined function is fit to the respective radially-oriented intensity profiles, the respective peaks of the set of curves or functions are determined according to known methods, and the corresponding set of respective pixels 930A–930D is identified. Next, a new best-fit circle is fit to the set of respective "peak pixels" 930A–930D according to any now known or later developed method that provides high accuracy, such as those that include outlier removal and the like. Next, the radius and center of that new best fit circle are used as the radius $R_{ic}$ in EQUATION 5 and as the center coordinates $p_i$ and $q_i$ used to determine the coordinates $x_i$ and $y_i$ in EQUATIONS 6A and 6B, in order to provide a more accurate refined estimate of the (x,y,z) coordinates of a target point in various exemplary embodiments according to this invention. It will be appreciated that although FIG. 9, for simplicity, shows two lines that are used as the basis for defining 4 data points that are fit to a circle, a greater number of lines and associated data points will generally provide higher accuracy.

More generally, the methods and operations outlined above with respect to FIGS. 8 and 9 are illustrative only and not limiting. A variety of alternative image processing operations may be used to locate the ring shaped image features and determine the desired target point coordinates. Descriptions of the image processing operations outlined above, as well as numerous alternatives, may be found in image processing literature, for example in *Machine Vision*, by Ramesh Jain, et al., McGraw Hill, 1995, which is incorporated herein by reference in its entirety.

Figure 10:
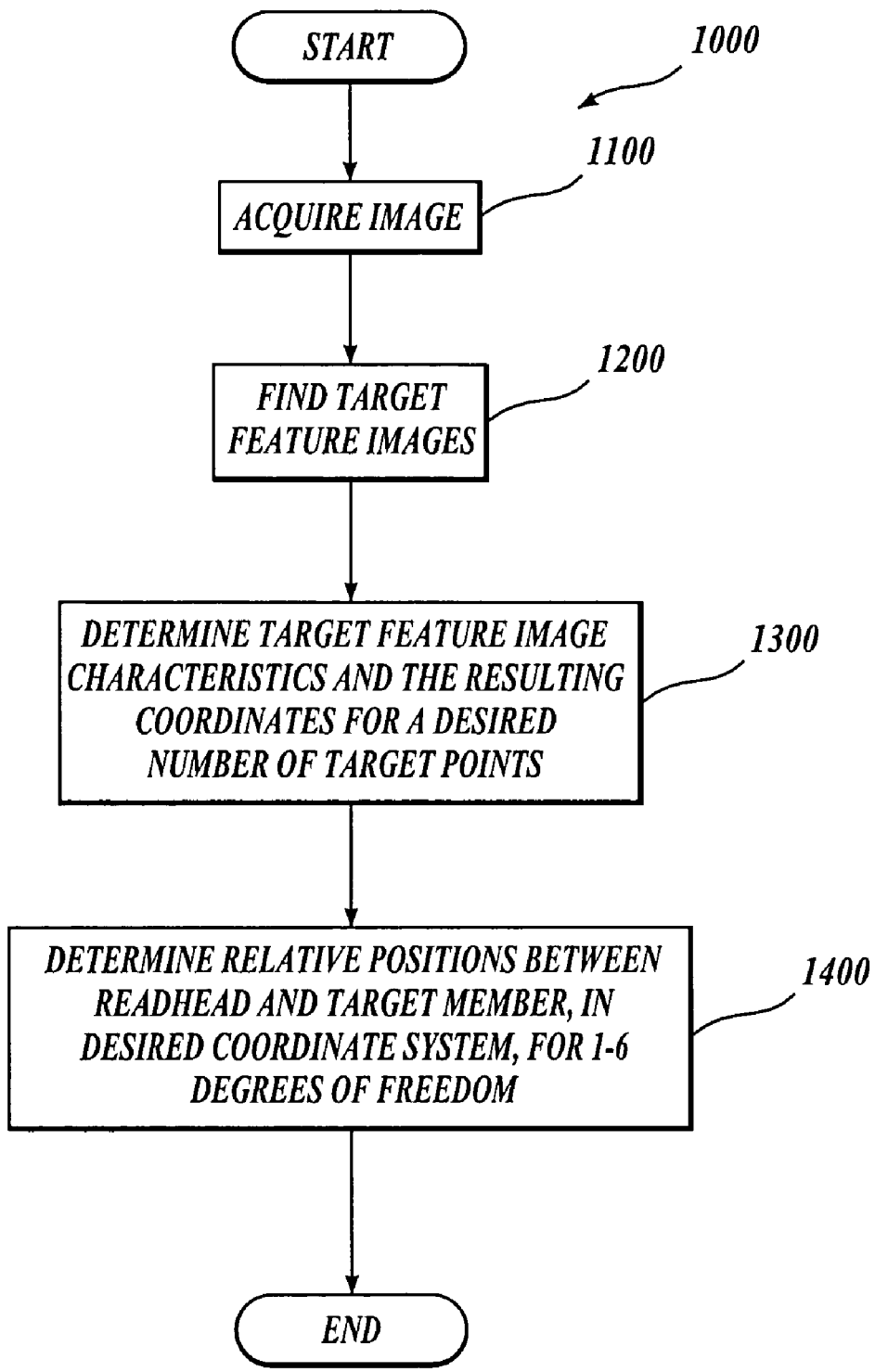
FIG. 10 is a flow diagram of a first exemplary algorithm, for determining a relative position measurement based on an image provided according to this invention.

FIG. 10 is a flow diagram of a first exemplary algorithm 1000, for determining a relative position measurement between a readhead and target member based on an image provided according to this invention. The algorithm begins at a block 1100 with acquiring a target member image. At a block 1200, operations are performed to find target image features such as the previously described ring shaped features, in the image acquired at the block 1100. Next, at a block 1300, operations are performed to determine the characteristics of the target feature images found at the block 1200, such as their image size and location, and to determine the resulting coordinates for a desired number of corresponding target points. The algorithm continues to a block 1400, where operations are performed to determine the relative position between the readhead and target member for 1 to 6 degrees of freedom in a desired coordinate system, based on the target point coordinates determined at the block 1300.

Figure 11:
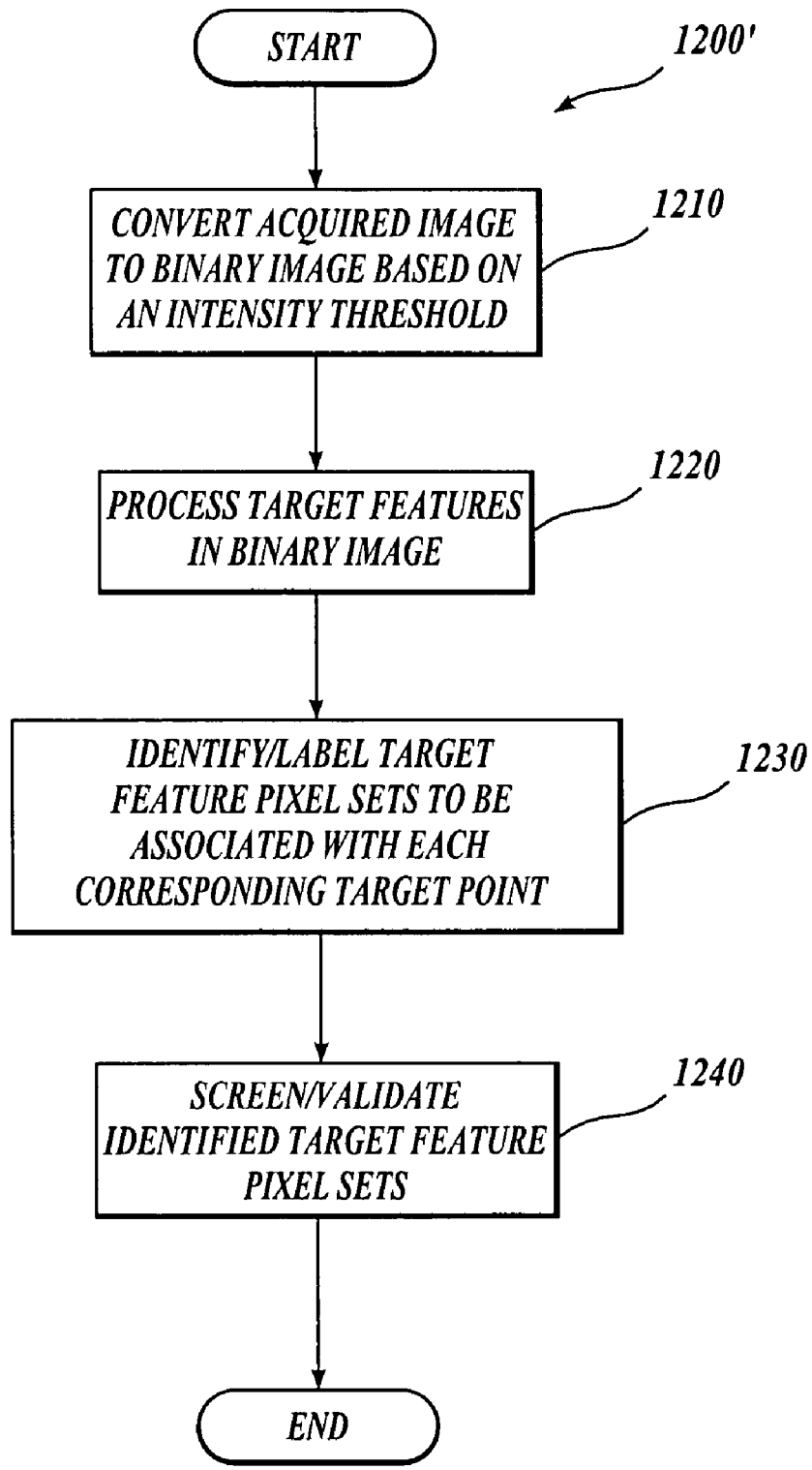
FIG. 11 is a flow diagram of a second exemplary algorithm, usable in the first exemplary algorithm, for identifying various target feature characteristics in an image provided according to this invention.

FIG. 11 is a flow diagram of a second exemplary algorithm 1200', which is one exemplary embodiment usable for the operations of the block 1200 of the first exemplary algorithm, for identifying various target feature characteristics in an image provided according to this invention. The algorithm begins at a block 1210 converting an acquired target member image according to this invention to a binary-valued pseudo-image, based on a default or specifically determined intensity threshold. At a block 1220, image processing operations are performed to isolate or identify desired target feature characteristics in the binary image. In one exemplary embodiment, the operations of the block 1220 apply one or more known image filtering operations to smooth the boundaries between the zero-valued (dark) pixels and the one-valued (light) pixels in the pseudo-image data and identifying pixels corresponding to two approximately circular single-pixel-wide tracks at the smoothed boundaries. The two tracks are preferably either both all-dark or both all-light pixels. The two approximately circular single-pixel-wide tracks provide target feature pixel sets corresponding to target feature characteristics that are associated with a corresponding target point.

Next, at a block 1230, operations are performed to effectively identify or label the desired target feature pixel sets that are to be associated with each corresponding target point. Next, in various exemplary embodiments according to this invention, at a block 1240 operations are performed to screen or validate the target feature pixel sets identified at block 1230, in order to eliminate pixel sets that pose a risk of providing degraded or invalid coordinates for a corresponding target point. In various exemplary embodiments the operations of block 1240 may comprise one or more of a pixel connectivity test indicative of sufficiently well-defined target features, a pixel outlier test based on an expected shape to be exhibited by a valid set of pixels, a test based on the proximity of adjacent pixel sets (which may indicate a potential distortion due to the overlap or proximity of adjacent target features images near the ends of the measuring range in various exemplary embodiments), and/ or any other now known or later developed test that serves the purpose of the block 1240. However, in various exemplary embodiments according to this invention where sufficiently clear target member images and/or sufficiently accurate measurement results are otherwise insured, the operations of the block 1240 may be omitted.

Figure 12:
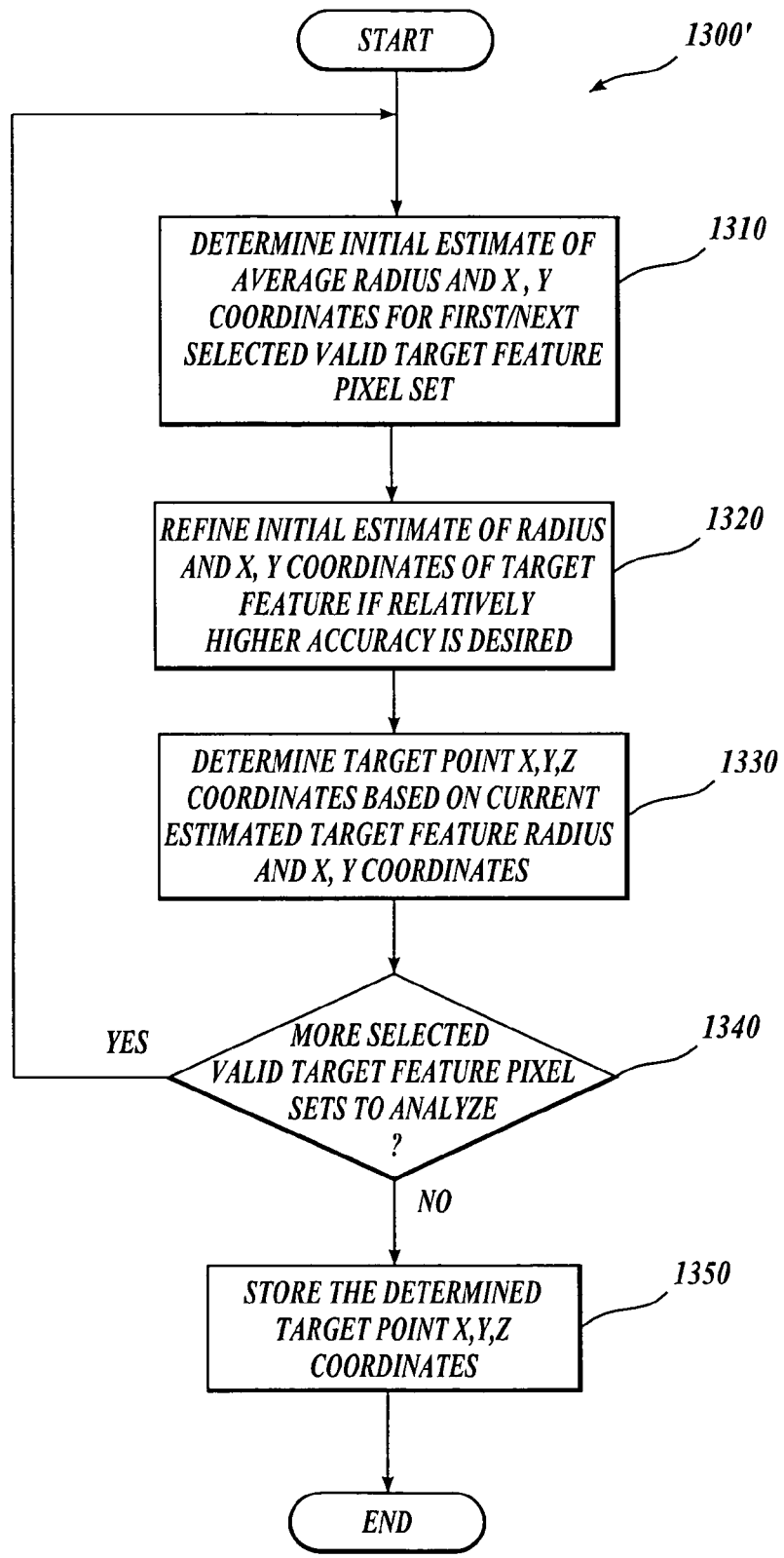
FIG. 12 is a flow diagram of a third exemplary algorithm, usable in the first exemplary algorithm, for determining the sizes and locations of various target features in an image provided according to this invention, and the resulting target point coordinates.

FIG. 12 is a flow diagram of a third exemplary algorithm 1300', which is one exemplary embodiment usable for the operations of the block 1300 of the first exemplary algorithm, for determining the sizes and location of various target features in an image provided according to this invention, and the resulting coordinates for a desired number of corresponding target points. The algorithm begins at a block 1310 by determining an initial estimate of the average radius and (x,y) coordinates of a target feature based on a first selected pixel set that is known or presumed to be a set of pixels usable to provide sufficiently accurate coordinates for a corresponding target point. The average radius and (x,y) coordinates of the target feature may be determined according to any suitable now known or later developed method. In various exemplary embodiments, the selected valid pixel set is provided by the results of the algorithm 1200'. In one exemplary embodiment, the results of the algorithm 1200' provide two concentric approximately circular single-pixel-wide tracks which characterize the target feature and the radius and coordinates of the corresponding target feature are determined based on the averaged centers and radii of best-fit circles that are fit to the two approximately circular single-pixel-wide tracks according to any known method.

Next, in various exemplary embodiments, at a block 1320 operations are performed to refine the initial estimates of the radius and center of a circle provided by the operation of the block 1310. The refined estimates are usable to determine the (x,y,z) coordinates of a corresponding target point to a higher level of accuracy than that provided by the initial estimates. The refined estimates may be determined according to any suitable now known or later developed method.

In one exemplary embodiment, the operations of the block 1320 comprise determining a plurality of lines or vectors extending through the initially estimated circle center and past the extremities of the corresponding selected pixel set. The lines are evenly spaced over 360 degrees about the initially estimated circle center. Next, operations are performed to identify respective sets of radially arranged pixel addresses that are closest to the respective lines, and that lie between the inner and outer boundaries corresponding to the target feature in the corresponding selected pixel set. Next, for each respective set of radially arranged pixel addresses, the corresponding intensity values in the original target member image are determined. Next, the pixel addresses or camera coordinates are determined that correspond to the respective nominal peak intensity locations for each of the respective sets of radially arranged pixel addresses. For example, in various embodiments a curve or a specific experimentally determined function is fit to the respective radially arranged intensity values, the respective peaks of the set of curves or functions are determined according to known methods, and the corresponding pixel addresses or camera coordinates are determined. Next, a best-fit circle is fit to the set of respective "peak pixels" according to any now known or later developed method, and the radius and center coordinates of that circle constitute the refined estimate provided at the block 1320. When the operations of the block 1320 are completed, operation passes to the block 1330.

It should be appreciated that in various exemplary embodiments or applications of the algorithm 1300', the initial radius and center coordinate estimates provided by the operations of the block 1310 are usable to identify the coordinates of the corresponding target point with sufficient accuracy for that embodiment of application. In such cases, the operations of the block 1320 are omitted. In such cases, operation passes directly form the block 1310 to the block 1330.

At the block 1330, the (x,y,z) coordinates of the corresponding target point are determined based on the current estimated target feature circle radius and (x,y) coordinates, by any now known or later developed method. The methods previously described herein are used in various exemplary embodiments. Next at a decision block 1340, if there are more selected target feature pixels set to analyze, the algorithm returns to operations at the block 1310. Otherwise, if there are no more selected target feature pixels set to analyze, the algorithm continues to a block 1350, where operations are performed to store the target point (x,y,z) coordinates previously determined by the algorithm 1300'.

Figure 13:
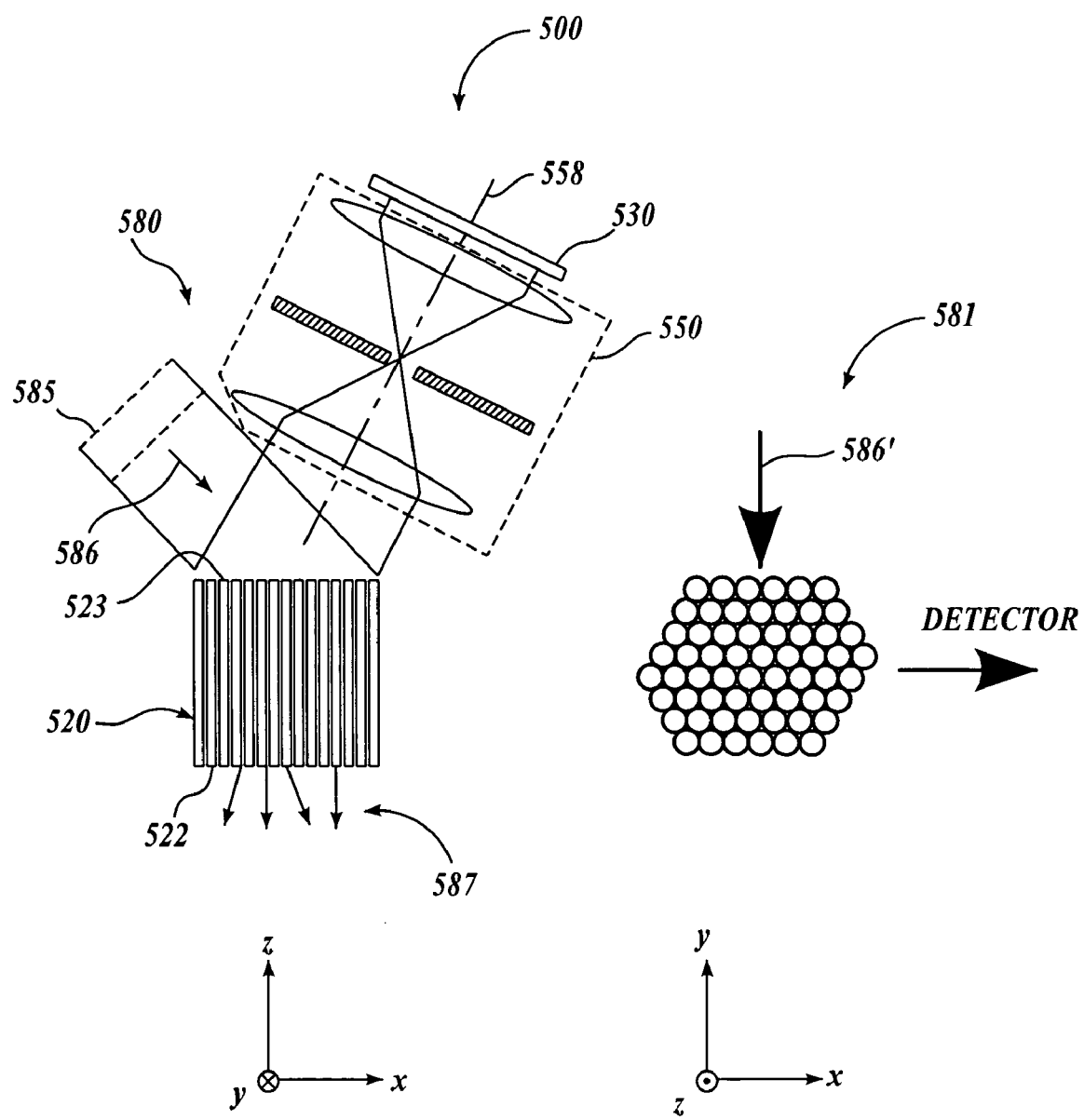
FIG. 13 schematically illustrates first and second exemplary illumination configurations usable in various position sensor arrangements in accordance with this invention.

FIG. 13 schematically illustrates a first exemplary illumination configuration 580 and second exemplary illumination configuration variation 581 usable in various position sensor arrangements in accordance with this invention. The illumination configuration 580 is shown in conjunction with a schematically represented position sensor arrangement 500 that includes components which are similar in configuration and operation to those in various readheads described above, and therefore only elements requiring additional explanation are described below. The position sensor arrangement 500 includes an OPA element 520 having an image light input face 522 and an image light output face 523, a light source 585, an angular filter 550 having an optical axis 558, and a detector 530. One addition to the position sensor arrangement 500 is the angled illumination configuration 580, comprising the angled light source 585.

The left illustration of FIG. 13 shows that the first illumination configuration 580 includes positioning the light source 585 to project the source light 586 toward the image light output face 523 of the OPA element 520 such that the output face 523 receives the illumination light 586, and the OPA element 520 transmits it from the image light input face 522 as scale illumination light 587. It should be appreciated that the rays of the illumination light 587 are not "selected" or filtered by the optical arrangement. Thus, the illumination light 587 illuminates a target member (not shown), that is positioned facing the image light input face 522, omnidirectionally. It should be appreciated that although the embodiment of the OPA element 520 is represented as a fiber bundle in FIG. 13, the angled illumination configuration 580 can also be used when various other type of OPA elements are used as the OPA element 520, for example, the axicon-type OPA element described below with reference to FIGS. 15–18. In addition, the angled illumination configuration 580 can be used in combination with other position sensor arrangements according to this invention, for example, the position sensor arrangement described below with reference to FIG. 19.

However, in some embodiments, when the angled illumination configuration 580 is oriented approximately as shown in the left illustration of FIG. 13, various amounts of stray light may be reflected or scattered from the image light output face 523 and received by the detector 530, which is detrimental to the quality and contrast of the desired target member images. Thus, in various embodiments, the illumination configuration variation 581 is used. The illumination configuration variation 581 arranges the light source 585 to direct the illumination light 586' at an angle transverse to a plane including the optical axis 558 and a line normal to the output face 523. Accordingly, little or no light is reflected or scattered to reach the detector 530.

In various other position sensor arrangements, illumination may be provided by a ring-light, positioned around the periphery of an OPA element near the plane of the image light input face for example, to directly illuminate the target member. Other illumination alternatives will be readily apparent to one of ordinary skill in the art, having benefit of this disclosure.

Figure 14:
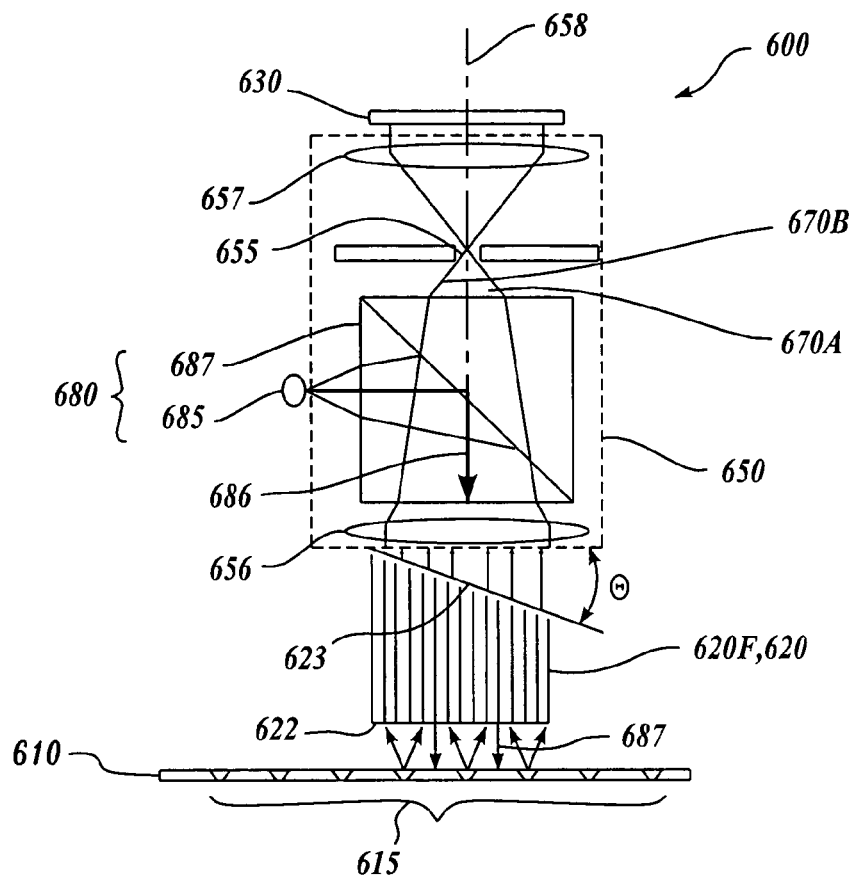
FIG. 14 is a schematic diagram illustrating a second generic embodiment of a position sensor arrangement according to this invention, that uses an optical fiber bundle and a first exemplary image light deflecting arrangement, such that various optical elements receiving the image light can be arranged along an axis parallel to the optical fiber axes, along with a third exemplary illumination configuration usable in various position sensor arrangements in accordance with this invention.

FIG. 14 is a schematic diagram illustrating a second generic embodiment of a position sensor arrangement 600 according to this invention, that includes various components which are similar in configuration and operation to those in various readheads described above, and therefore only elements requiring additional explanation are described below. The position sensor arrangement 600 includes an OPA element 620 comprising a fiber bundle OPA 620F that has an image light input face 622 and an image light output face 623, an illumination configuration 680, an angular filter 650, a detector 630 and a target member 610 that includes target points 615.

One addition to the position sensor arrangement 600 is the light deflecting configuration of the fiber bundle OPA 620F, which allows an optical axis 658 of the angular filter 650 to be aligned with the axes of the fiber bundle OPA 620F. As shown in FIG. 14, relative to a plane normal to the optical axis 658, the image light output face 623 of the fiber bundle OPA 620F is inclined at an angle θ. It should be appreciated that the ends of the fibers of the fiber bundle OPA 620F are beveled at this same angle relative to the fiber axes, thus, any light output by the fiber bundle OPA 620F will be refracted accordingly.

Referring back to various elements illustrated in FIG. 1, the light of the light cone 125 that is output approximately parallel to the operable direction/optical path 126, is made to pass through an angular filtering arrangement that is intentionally angled from the fiber axes 101 and 101' by the angle α, in order to establish the acceptance or detection cone angle α, as described in FIG. 1 and shown in the previous position sensor arrangements herein. It should be appreciated that according to the teachings for the configuration of FIG. 1 it is the cone angle α that allows the z-coordinate to be determined from an image of a target point, as described herein.

In comparison, in this position sensor arrangement 600, the angle θ of the fiber bundle OPA 620F is designed such that the light rays that would be directed at the angle α along the optical path 126 in the configuration of FIG. 1, are instead refracted to be parallel with the fiber axes in the position sensor arrangement 600. In the position sensor arrangement 600, this is dictated by the alignment of the optical axis 658 of the angular filter 650 parallel to the fiber axes of the fiber bundle OPA 620F. To refract rays parallel to the fiber axes, given a desired value for one of the angles α or θ, the other may be determined from:

$$\alpha = \sin^{-1}[n \sin(\theta - \sin^{-1}(\sin\theta/n))] \quad \text{(Eq. 21)}$$

where n is the effective refractive index of the fiber bundle. For instance, to establish an acceptance or detection angle of α=20 degrees for the detected light rays from the target member 610, when n≈1.57, the wedge angle θ is approximately 35 degrees.

It should be appreciated that the images of the target points 615 are circular, not elliptical, in the previously described embodiment of the position sensor arrangement 600. It should also be appreciated that if the arrangement is altered in terms of the orientation of the optical axis 658, or the angle θ, an operable arrangement, in general, can still result. However, the operable detection angle α will vary in dependence on both of these factors, and the target point images will be ellipses if the optical axis 658 of the angular filter 650 is not parallel to the fiber axes.

Another addition to the position sensor arrangement 600 is the illumination configuration 680. The illumination configuration 680 includes a light source 685 positioned to project a source light 686 toward a beam splitter 687, which deflects the source light 686 toward the image light output face 623 of the OPA element 620. The output face 623 receives the illumination light 686, and the OPA element 620 transmits it from the image light input face 622 as scale illumination light 687. It should be appreciated that the rays of the illumination light 687 are not "selected" or filtered by the optical arrangement. Thus, in various embodiments, if the source light 686 is not collimated as it enters the image light output face 623, and/or if the image light output face 623 is angled relative to the direction of the source light 686, as it is for the fiber bundle OPA 620F, then the illumination light 687 will illuminate the surface of the target member 610 omnidirectionally.

It should be appreciated that although the embodiment of the OPA element 620 is represented as the fiber bundle OPA 620F in FIG. 13, the illumination configuration 680 can be used as readily when various other type of OPA elements are used as the OPA element 620, for example, the axicon-type OPA element described below with reference to FIGS. 15–18. In addition, the angled illumination configuration 680 can be used in combination with other position sensor arrangements according to this invention, for example, the position sensor arrangement described below with reference to FIG. 19.

It should also be appreciated that the interposed beam splitter 687 affects the optical path(s) of the image light that is transmitted to the detector 630 by the angular filter 650, as indicated by the refracted paths of the light rays 670A and 670B in FIG. 14. Accordingly, in comparison to the previously described angular filter 250 shown in FIG. 2, for example, the spacing is adjusted between the optical components bounding the beam splitter 687 along the optical axis 658, in order to preserve the previously outlined operation of an angular filter according to this invention. The necessary adjustments can be readily determined by one of ordinary skill in the art, and therefore are not described further here.

Figure 15A:
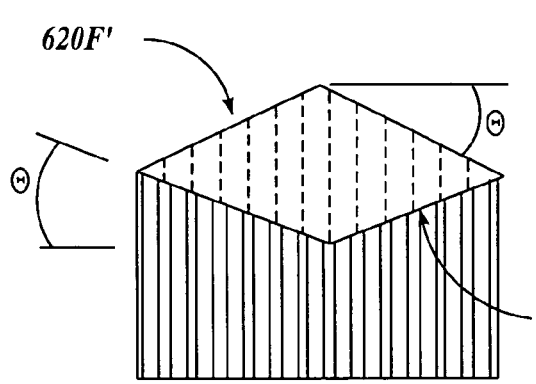
FIGS. 15A and 15B depict second, third and fourth exemplary image light deflecting arrangements usable in the second embodiment of a generic position sensor arrangement according to this invention.
Figure 15B:
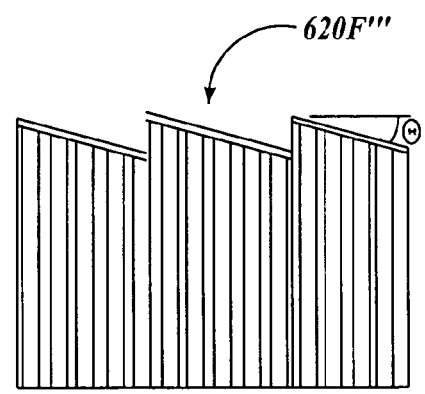

FIG. 15A depicts second and third alternative image light deflecting configurations 620F' and 620F", which respectively indicate alternative "protruding" and "intruding" configurations of a fiber bundle image light output face that perform the same function as the image light output face 623 on FIG. 14, when the angles θ are determined in the same manner. The FIG. 15B depicts yet another fourth alternative image light deflecting configuration 620F''' where the angle θ of each surface portion is similarly determined. Such configurations may introduce slight image artifacts where their surface planes end or intersect. However, a configuration results that may be used to reduce overall dimensions of these OPA elements along the fiber axis direction, and image quality will still be sufficient for many applications.

It should also be appreciated that in yet other embodiments, a suitably angled prism may be placed along the optical axis adjacent to the image light output face of various "non-refracting" OPA's (that is, where the angle θ is effectively zero), whether of a fiber bundle type or otherwise, and the same functional result may be achieved.

Figure 16:
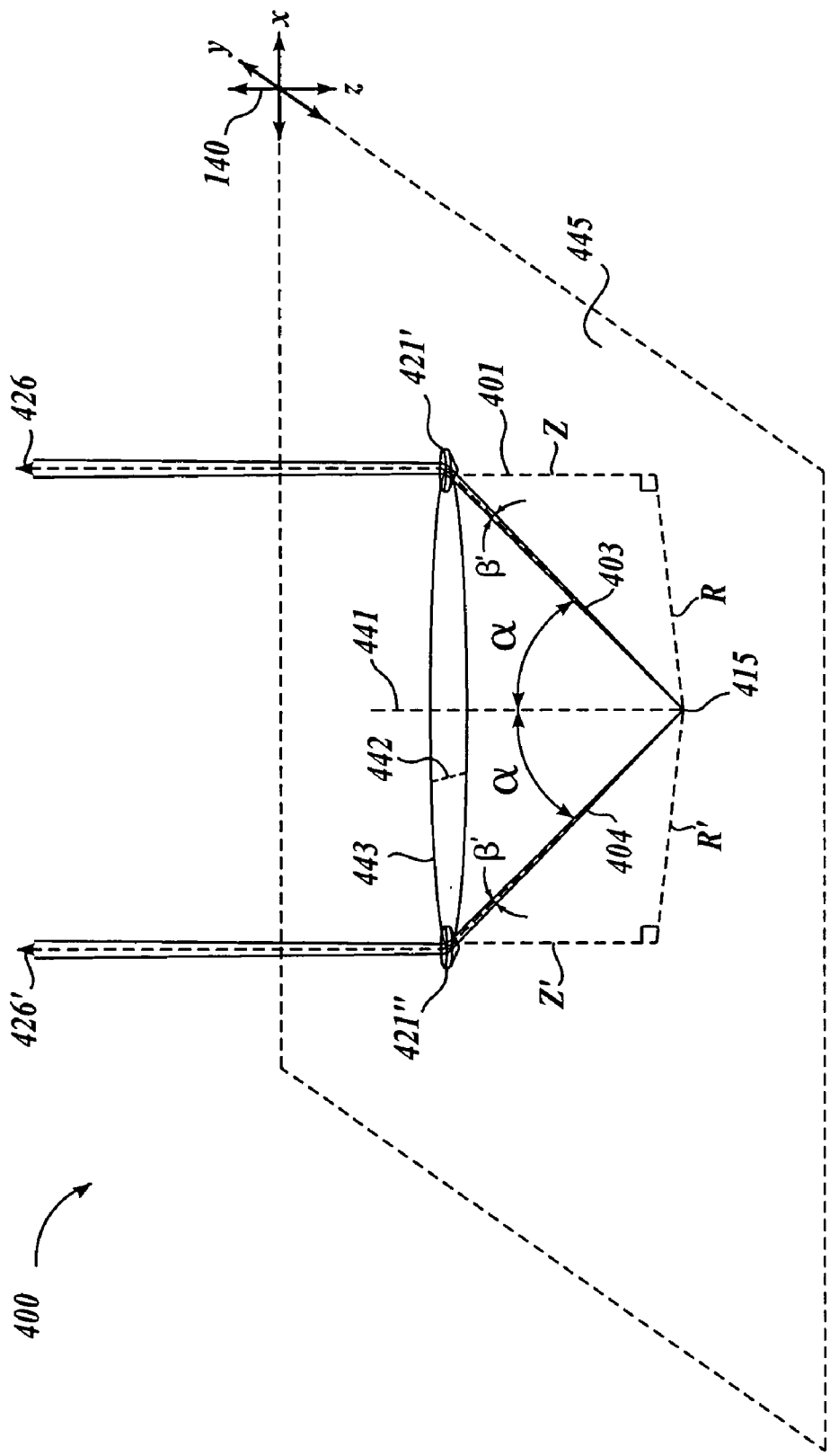
FIG. 16 is an isometric view showing an axicon lens OPA configuration that illustrates the operation of differently located miniature axicon lenses included in an axicon lens array usable as an optical path array element according to this invention.

FIG. 16 is an isometric view showing an axicon lens OPA configuration 400 that illustrates the operation of differently located single axicon lenses, 421' and 421", respectively, included in an axicon lens array usable as an optical path array element (OPA element) according to this invention. The axicon lens OPA configuration 400 includes various dimensional references and operating principles which are similar to the fiber bundle OPA configuration 100 described above, and therefore only elements requiring additional explanation are described below. Elements numbered 4XX in FIG. 16, provide functions similar to or identical to the analogous elements numbered 1XX in FIG. 1.

Similarly to the optical fiber OPA configuration 100, an angular filtering arrangement determines that only light output along a particular respective operable direction from each axicon lens of an axicon lens array used as an OPA element of the position sensor will reach an optical detector of the position sensor. Thus, the operable polar angle α is dictated by the particular arrangement of a particular position sensor. Accordingly, it should be appreciated that for purposes of explanation, in FIG. 16 a point 415 and/or the axicon lenses 421' and 421" are shown at "selected" locations that conform to a dictated operable angle α. As previously described for the optical fiber OPA configuration 100, in the general case, combinations of points and optical fiber input ends that are positioned so that they do not conform to a dictated operable polar angle α are non-operable. That is, optical paths corresponding to angles of incidence other than α are blocked by the angular filtering arrangement that dictates the operable polar angle α.

FIG. 16 shows the respective operable direction/optical paths 426 and 426' from the axicon lenses 421' and 421". In the embodiment of the axicon lens OPA configuration 400 shown in FIG. 16, the operable directions of the parallel operable direction/optical paths 426 and 426' are perpendicular to a reference plane of the axicon lens OPA, which is described with reference to FIG. 18, below. In much the same way as previously described for the light deflecting configuration of the fiber bundle OPA 620F shown in FIGS. 14–15B, it should be appreciated that the relationship between the operable polar angle α and the direction of the operable direction/optical paths 426 and 426' is established by the refractive characteristics of an axicon lens OPA according to this invention. This aspect of an axicon OPA according to this invention is described in greater detail below.

As shown in FIG. 16, the two axicon lenses 421' and 421" are located at respective operable positions relative to a point 415, such that each of the axicon lenses 421' and 421" can receive light from the point 415 at the operable polar angle α relative to their central axes. Specifically, the axicon lenses 421' and 421", respectively, are positioned such that their input faces or front faces receive narrow beams of light rays 403 and 404, respectively, from the point 415. The beams of light rays 403 and 404 that reach the detector encompass an angle β'.

The beams of light rays are refracted by the axicon lenses 421' and 421" and exit from the back faces along the parallel operable direction/optical paths 426 and 426'. The operable direction/optical paths 426 and 426' are defined by, and parallel to, the optical axis of an angular filtering arrangement (not shown) according to this invention, such that they reach an optical detector, as previously described. Any of the previously described angular filtering arrangements 250, 550, and 650, or the collimator array described below, or the like, including any compatible illumination configuration, may be used in combination with the axicon lens OPA configuration 400.

One operating difference in comparison to the fibers of the optical fiber OPA configuration 100 is that the axicon lenses 421' and 421" of the of the axicon lens OPA configuration 400 do not produce output light cones from the light rays 403 and 404. Instead, each individual light ray entering one of the axicon lenses 421' and 421" is output from the lens along an individual direction. As previously indicated, the individual light rays that exit each lens approximately parallel to the operable direction/optical path 426 (or 426') will pass through the angular filtering arrangement, to strike a respective pixel or a small group of pixels of the position sensor's optical detector to form a portion of an image on the optical detector.

Accordingly, it should be appreciated that, for the axicon lens OPA configuration 400, similarly to the fiber bundle OPA configuration 100 described above, the point 415 is imaged onto an optical detector at a plurality of locations on the optical detector. For example, for the embodiment of the axicon lens OPA configuration 400 shown in FIG. 16, the point 415 would be imaged onto two locations on the position detector that receive the light transmitted along the two parallel optical paths 426 and 426'.

The beams of light rays 403 and 404 that are input to the axicon lenses 421' and 421" coincide with a location on the surface of a hypothetical cone 442 that has a cone axis 441 that is parallel to the central axes of the axicon lenses, an apex located at the point 415, and a cone angle that is equal to the operable polar angle α. The hypothetical plane 445 coincides with the point 415 and is oriented normal to the cone axis 441. The dimension Z is the distance between a reference surface of an axicon lens OPA (described below) and the hypothetical plane 445, along the direction perpendicular to the plane 445. The distance R is equal to $Z*\tan\alpha$, that is, the distance from the cone axis to the point where light rays 403 and 404 intersect with the reference plane of the axicon OPA. Thus, the Z coordinate of a point 415 may be determined by the size of the image that the point 415 creates on an array detector of the position sensor, as previously explained with reference to FIGS. 1–4B.

The axicon lenses 421' and 421" are representative of axicon lenses in various exemplary embodiments according to this invention, that are included in a densely packed, nominally planar, axicon lens array comprising a set of axicon lenses having parallel central axes. In such a case, relative to the point 415, Z and R will be the same for each axicon lens input surface that contributes to the image of the point 415, and the operable axicon lenses will form a circle, approximately coinciding with the circle 443 shown in FIG. 16.

Figure 17:
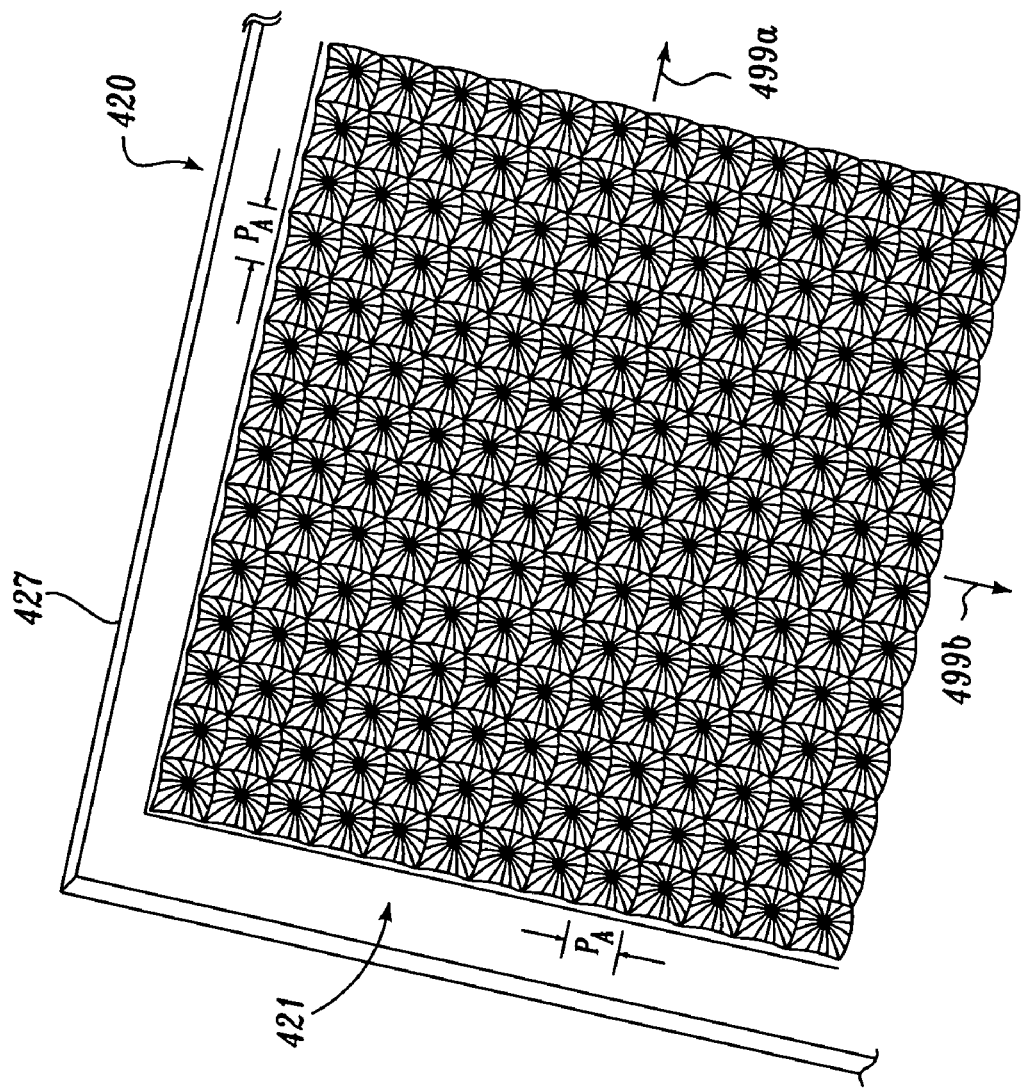
FIG. 17 is an isometric view showing a portion of an axicon lens OPA usable as an optical path array element according to this invention.

FIG. 17 is an isometric view showing a portion of the image light input face an axicon lens array OPA element (axicon OPA element) 420 usable as an OPA element according to this invention. The axicon OPA element 420 includes an array of axicon lenses 421 on an array substrate 427. The embodiment of the array of axicon lenses 421 shown in FIG. 17 includes individual axicon lenses arranged in a array along two orthogonal directions, at an axicon array pitch PA. The array of axicon lenses 421 and the array substrate 427 extend as indicated by the arrows 499a and 499b to provide an area that is at least large enough to receive all image light that is received by an array detector used in conjunction with the axicon OPA element 420. In one exemplary embodiment, the array substrate 427 has thickness $t_s$ of 1.5 mm and is borosilicate glass, and the array of axicon lenses 421 has an array pitch PA of 100 μm. In various exemplary embodiments, the array of axicon lenses 421 is a molded or embossed optical grade polymer affixed to a surface of the array substrate 427 during the molding process, or with an optical grade adhesive, or the like. In various exemplary embodiments, the axicon lenses comprise protruding conical surfaces, and in various exemplary embodiments, the axicon lenses comprise intruding conical surfaces. In any case, such micro-molded lenses can be made by known micro-molding or micro-embossing techniques, or the like.

More generally, the array of axicon lenses 421 is arranged in any desired densely packed or close packed arrangement. In various exemplary embodiments, the individual lens diameter and/or array pitch PA, or other characteristic lens size and spacing, is chosen such that the nominal lens dimension images to a dimension that is smaller than one pixel on an array detector of a position sensor according to this invention. In one exemplary embodiment, the lens diameter is approximately 6 μm. In various other exemplary embodiments, the lens diameter is selected in a range from 3 μm to 150 μm, or more. However, this example is illustrative only, and not limiting. Larger lens diameters are used in various other exemplary embodiments that sacrifice some accuracy and/or resolution in order to use more economical components. In such lower-accuracy embodiments, a larger diameter may be used, up to 200 μm or more.

The array of axicon lenses 421 may give rise to diffraction or interference effects in the target point images arising from the axicon OPA element 420. In various exemplary embodiments, the array pitch PA is chosen so that such effects are not significant with respect to a desired level of accuracy for a position sensor according to this invention, as may be determined and/or verified by experiment or simulation, if needed.

Figure 18:
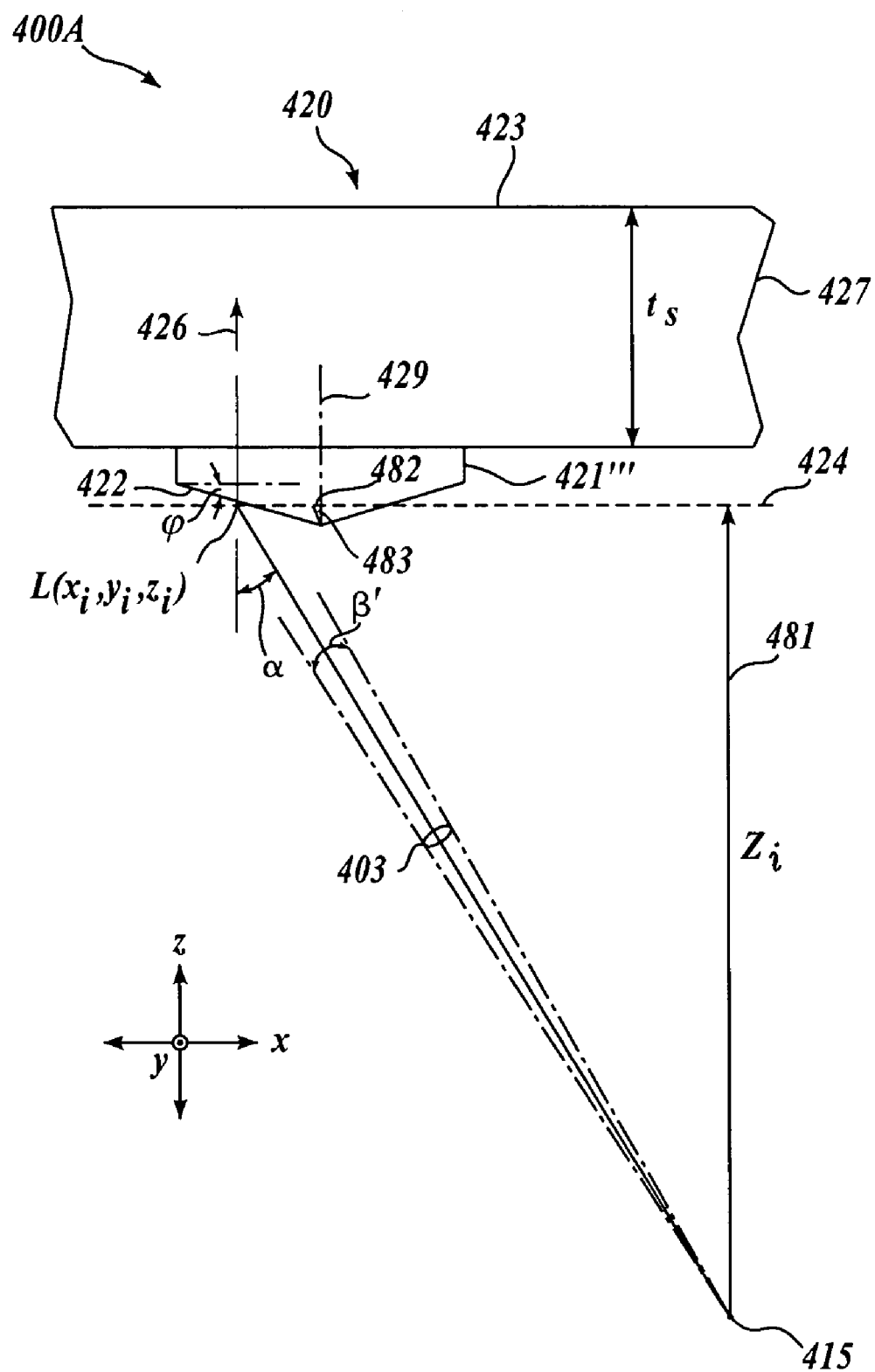
FIG. 18 is a view illustrating a light ray configuration of an exemplary optical path through one lens of the axicon lens OPA of FIG. 17 and an exemplary set of coordinate relations for analyzing the ring images arising from target points imaged through the axicon lens OPA element.

FIG. 18 is a view, parallel to an X-Y plane, illustrating a light ray configuration 400A that shows an exemplary optical path through a representative axicon lens 421''' of the axicon OPA element 420 of FIG. 17 and an exemplary set of coordinate relations for analyzing the ring images arising from target points imaged through the axicon OPA element 420. It should be appreciated that the scale of the axicon lens 421''' is greatly exaggerated relative to the other elements shown in FIG. 18, to better illustrate various aspects of the operation of an axicon OPA element according to this invention. The illustration of the light ray configuration 400A also shows a representative axicon lens 421''' that has a central axis 429, and a coordinate system reference plane 424 of the axicon OPA element 420 that coincides with a nominal plane of the image light input faces 422 of the lenses 421''' of the axicon OPA element 420, as described further below. The axicon lens is not drawn to scale in FIG. 17. Rather, it is oversized, to better illustrate the features described below.

A beam of light rays 403, subtended by an angle β' that is effectively defined by the limiting aperture of the angular filtering arrangement, includes light rays that eventually reach an array detector. The beam of light rays 403, represented by the central ray that is shown as a solid line, travels along a path at the angle α, as previously described with reference to FIG. 16, and intersects with the reference plane 424 at a point $L(x_i, y_i, z_i)$. As indicated by the arrow 481, the distance from a point (target point) 415 or the like to the reference plane 424, along a direction normal to the reference plane 424, is the coordinate $z_i$. The coordinates $(x_i, y_i, z_i)$ are functionally the same as the coordinates $(x_j, y_j, z_i)$ previously described with reference to FIGS. 4A and 4B, and shown in EQUATIONS 6a, 6b, and 7. At approximately the point L($x_i,y_i,z_i$), the central ray 403 strikes a point on an image light input face 422 of the axicon lens 421''' at an angle ($\alpha+\phi$) relative to an axis normal to image light input face 422 at that point. The angle $\phi$ is the angle of inclination of the cone of axicon lens 421''' relative to a plane normal to the central axis 429, and also relative to the reference plane 424. In the embodiment shown in FIG. 18, the angle $\phi$ is selected in combination with the refractive index of the material of the axicon lens 421''', such that the light ray 403 is refracted along an operable direction/optical path 426 that is parallel to the optical axis of an angular filter according to this invention, which is parallel to the z-axis. The refracted ray 403 then travels through the thickness $t_s$ of the substrate 427, and exits from the image light output face 423 of the array substrate 427 to reach the array detector of a position sensor according to this invention. It will be appreciated that when the operable directions/optical paths 426 of an axicon OPA element 420 are parallel to its central axes 429, then the image of a target point will form a circle on an array detector surface arranged normal to the operable directions/optical paths 426.

In order to refract rays parallel to the operable direction/optical path 426 when it is parallel to an axis normal to the reference plane 424 of the axicon OPA element 420, given a desired value for one of the angle $\alpha$ or the angle of inclination $\phi$ of the conical axicon face, the other angle can be determined from:

$$\alpha=(\sin^{-1}(n \sin \phi))-\phi \quad \text{(Eq. 22)}$$

where n is the index of refraction of the axicon lens material. For instance, with an acceptance or detection angle of $\alpha=15$ degrees for the detected light rays from the target member 410, when n≈1.5 the angle of inclination $\phi$ of an axicon lens is approximately 25.9 degrees.

The image light input face 422 is angled with respect to the reference plane 424. Thus, theoretically, a point where the ray 430 strikes the image light input face 422 "above" or "below" the reference plane 424 includes a radial error component $\epsilon_{ar}$ relative to the desired coordinates L($x_i,y_i,z_i$) where the ray 430 intersects with the reference plane 424. When the reference plane 424 is defined as the plane coinciding with the average "height" of the image light input faces 422 of the axicon lenses 421''', the maximum value of the error $\epsilon_{ar}$ is approximately $\epsilon_{armax}=+/-\tan^2\phi*$(axicon radius)/2, which is illustrated by the base 482 of the triangle 483 in FIG. 18. For example, for an axicon radius of approximately 10 μm and an angle $\phi$ of approximately 25.9 degrees, the corresponding maximum error $\epsilon_{armax}$ is approximately +/−1.2 μm.

However, it should be appreciated that the image of a target feature is typically blurred, as previously described. Furthermore, in various exemplary embodiments according to this invention, the beam width associated with the angle β' is large enough in relation to the size of each axicon lens 421''', that the beam of light rays 403 illuminates the entire image light input face 422. These characteristics effectively average out or nullify the potential error $\epsilon_{ar}$. Thus, the potential error $\epsilon_{ar}$ is of no practical significance except, potentially, in crude low accuracy embodiments that use axicon lenses that are large relative to the beam width associated with the angle β'.

Figure 19:
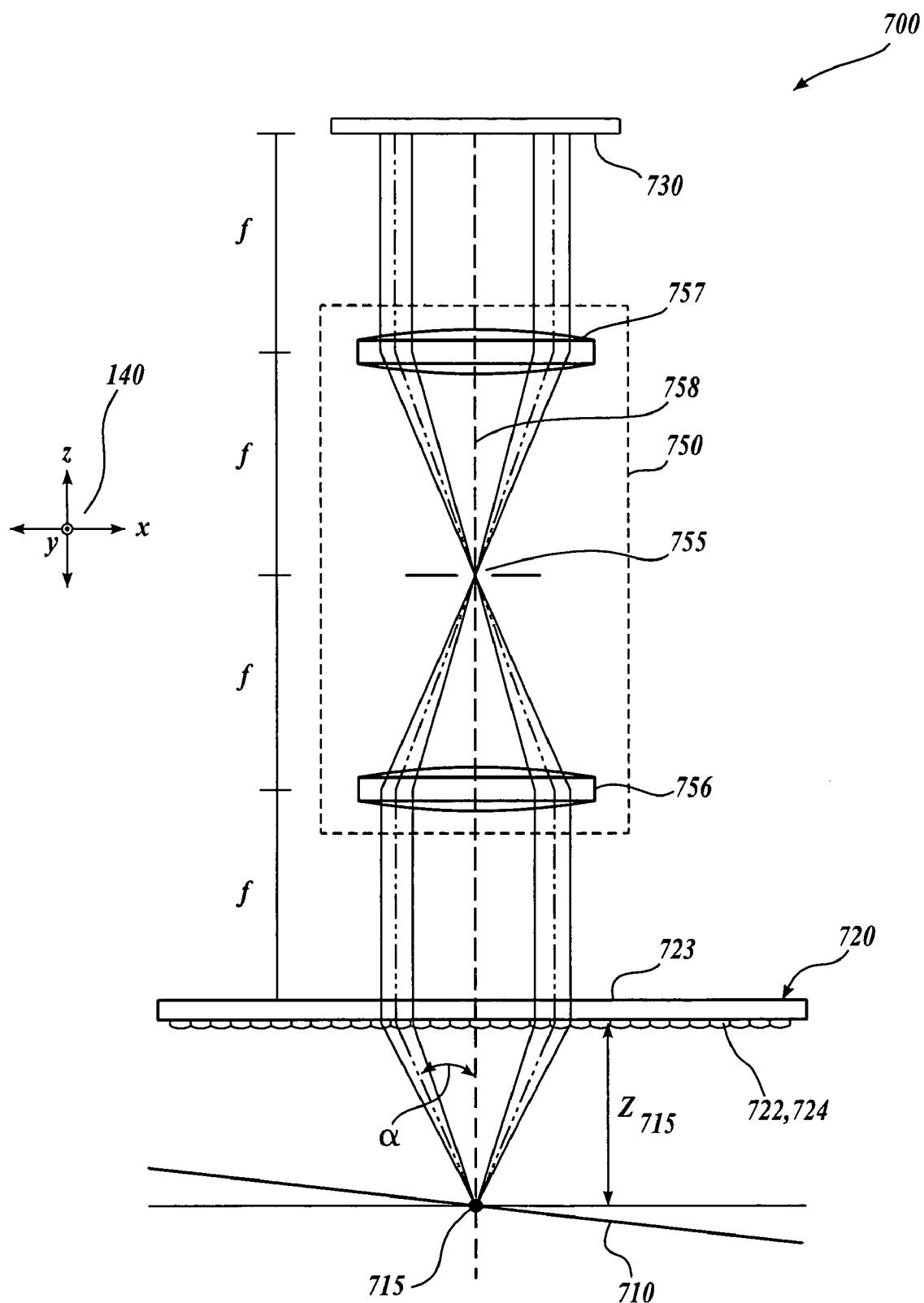
FIG. 19 is a schematic diagram illustrating a third generic embodiment of a position sensor arrangement according to this invention, that uses an axicon lens OPA element, or an optically similar array element, as an optical path array element according to this invention.

FIG. 19 is a schematic diagram illustrating a third generic embodiment of a position sensor arrangement 700 according to this invention, that uses an OPA element 720 with a lens array located to provide the image light input face 722, which in various exemplary embodiments comprises the axicon OPA 420 described above, or an OPA element comprising an array of functionally similar optically path elements.

Regarding functionally similar optical path elements, such elements include, but are not limited to, various types of diffractive optical element (DOE) lenses, including Fresnel lenses, and the like. DOE lenses, including Fresnel lenses, and the like, may be designed and fabricated according to known methods. Custom designed and fabricated DOE lenses, Fresnel lenses, and/or arrays are available from various sources, for example, Digital Optics Corporation, 9815 David Taylor Drive, Charlotte, N.C., USA. DOE lens design techniques are also described in *MICRO-OPTICS: Elements, Systems and Applications*, Edited by Hans Peter Herzig. Taylor & Francis, London, 1970, and *Methods for Computer Design of Diffractive Optical Elements*, Edited by Victor A. Soifer. Wiley-Interscience; John Wiley and Sons, Inc., New York, 2002, which are incorporated herein by reference.

In various exemplary embodiments, the position sensor arrangement 700 includes various dimensional references and operating principles which are similar to the position sensor arrangement 200 described above, and therefore only elements requiring additional explanation are described below. In general, elements numbered 7XX in FIG. 19, provide functions similar to the analogous elements numbered 2XX in FIG. 2.

As shown in FIG. 19, the position sensor arrangement 700 includes a target member 710, including a target point 715 that is representative of a number of target points. The OPA element 720 has an image light output face 723 and an image light input face 722 that coincides with a coordinate system reference plane 724 of the position sensor arrangement 700. The position sensor arrangement 700 also includes an exemplary embodiment of an angular filter portion 750 and a detector array 730.

The embodiment of the angular filter portion 750 shown in FIG. 19 includes a lens 756 with a focal length f, an aperture 755, and a lens 757 with a focal length f, arranged in a doubly telecentric arrangement that provides no magnification or reduction of the image provided at the image light output face 723 the OPA element 720. Although the lenses 756 and 757 are shown as biconvex lenses in the embodiment shown in FIG. 19, it should be appreciated that any other lens configuration, that is operable according to this invention, may be used. Furthermore, in various other exemplary embodiments, the lens 757 is eliminated from the angular filter portion 750, and the array detector 730 is fixedly mounted relative to the aperture 755 and the lens 756, in place of the lens 757 at the distance f from the aperture 755. This configuration also provides an image magnification of 1:1. In various other exemplary embodiments, the camera is mounted at another distance from the aperture 755, in order to provide a desired magnification or reduction other than 1:1. Other less desirable, but nevertheless operable, configurations of the angular filter portion 750 will be apparent to one of ordinary skill in the art having benefit of this disclosure.

In one exemplary embodiment, the optical components of the angular filter portion 750 shown in FIG. 19 are selected and arranged such that the dimension f shown in FIG. 19 is approximately 25.4 mm, the angle $\alpha$ is approximately 15 degrees, and the aperture 755 has a diameter of approximately 2 mm. The OPA that forms the OPA element 720 has a thickness of approximately 1.6 mm, including substrate and lenses, and dimensions along the x and y axes that are approximately 12 mm. The target points have a dimension of approximately 100 μm, and are spaced apart by a pitch of 1.0 mm along two orthogonal axes on the target member 710. The array detector 730 is approximately 4.7 mm by 3.5 mm, and includes 640 columns and 480 rows of pixels arranged at a pitch of approximately 7.4 μm along the orthogonal row and column directions. The target member nominal operating separation from the bottom plane, or reference plane, of the fiber bundle that forms the OPA element 720 is approximately 2.0 mm+/−1.5 mm. With suitable image processing, as outlined further below, such a configuration is estimated to provide a resolution and accuracy of approximately 2–4 μm for X, Y and Z translations, and approximately 0.1 degrees for roll, pitch and yaw angles.

It should be appreciated that the parameters and elements of the foregoing specific exemplary embodiment are illustrative only, and not limiting. Numerous other operable embodiments are possible, and will be apparent to one of ordinary skill in the art, having the benefit of this disclosure.

Figure 20A:
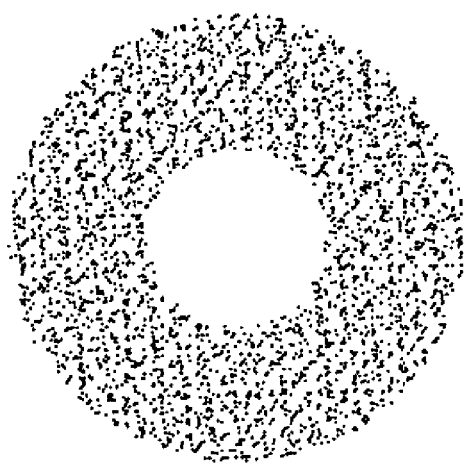
FIG. 20 depicts three exemplary images provided according to this invention using an axicon lens array, or an optically similar array element, as an optical path array element according to this invention.
Figure 20B:
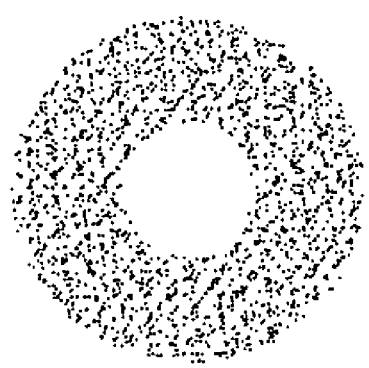
Figure 20C:
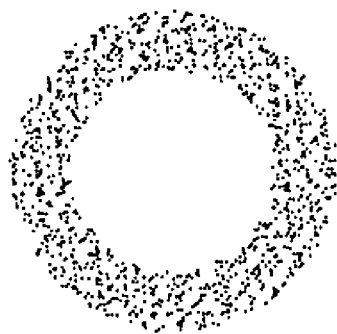

FIG. 20 depicts three exemplary quantitatively simulated images provided as input at the plane of an array detector for a simulated position sensor configuration similar to that outlined above, that includes an axicon OPA element, or an optically similar OPA element, according to this invention. For the images shown in FIG. 20, $P_A$=100 μm for the OPA element, and the aperture diameter is 2.0 mm. FIG. 20-A shows one exemplary target point image for a first z-coordinate near a measuring range limit of the simulated position sensor. FIG. 20-B shows one exemplary target point image for a second z-coordinate that is approximately 66% of the first z-coordinate used for FIG. 20-A. FIG. 20-C shows one exemplary target point image for the second z-coordinate when an aperture diameter of 1.0 mm is used, resulting in a thinner circle for the target point image. The size and position of the thinner circle image, and the resulting measurements, may be determined with better resolution in various exemplary embodiments.

Regarding the foregoing embodiments of the angular filter portions 250, 550, 650 and 750, although these are telecentric type angular filters, this invention is not so limited. More generally, any other now known or later developed angular filter portion may be used, provided that it is operable to transmit only direction-selected light rays of the output image light to form a target feature image on the detector array that is usable according to this invention.

For example, in various embodiments the angular filter portion comprises a collimating array, that is, an array or bundle of micro-miniature tube-like structures that have parallel axes and a long, narrow, profile in order to provide a small acceptance angle. The small acceptance angle provides the angular filtering in various exemplary embodiments according to this invention. The parallel axes of the tube-like structures define the effective optical axis of the collimating array. Light rays that deviate from the optical axis by an angle greater than the acceptance angle either fail to enter the collimator array or are absorbed within it. Hence, only light rays approximately parallel to the optical axis form an image on the detector.

One advantage of such collimator arrays is that they can be used without lenses, and the depth of field limitations and focal length dimension requirements associated with lenses do not constrain a position sensor arrangement that uses a collimator array. Thus, a position sensor arrangement according to this invention can be made more compactly when the optical path array element comprises a collimator array. In one exemplary embodiment, the collimator array comprises a bundle of hollow optical fibers, or other fibers having a sufficiently small acceptance angle. Such collimator arrays are available, for example, from Collimated Holes, Inc., 460 Division Street, Campbell, Calif., USA 95008. In another exemplary embodiment, the collimator array is a silicon micro-machined collimating array, for example fabricated approximately as described in "Angular Domain Imaging of Objects Within Highly Scattering Media Using Silicon Micromachined Collimating Arrays," by G. Chapman, et. al. *IEEE Journal of Selected Topics in Quantum Electronics*, Vol. 9, No. 2, March/April 2003, pp. 257–266, which is incorporated herein by reference in its entirety.

In various exemplary embodiments, a collimator array according to this invention has an area that is sufficient to angularly filter all of the light rays that reach the array detector, and an acceptance angle in the range of approximately 0.35–0.75 degrees. For a hollow tube-like structure having a length of approximately 200 μm, this acceptance angle range corresponds to a diameter range of approximately 5–10 μm. However, this example is illustrative only, and not limiting. In various other lower-accuracy embodiments, a larger acceptance angle may be used, up to approximately 1.5 degrees or more.

The types of angular filter portions described previously herein provide a symmetric respective image features corresponding to a respective target features. Such embodiments allow the coordinates of a target point to be accurately determined with relatively simple image processing and/or coordinate transformations in various exemplary embodiments according to this invention. However, more generally, it should be appreciated that there are other angular filter portion configurations that are usable with an OPA element according to this invention, that provide a less symmetric or "distorted" target point image on the array detector. Although they are less desirable, such target point images are nevertheless operable in various position sensor arrangements according to this invention, when used in conjunction with more complex image processing and/or coordinate transformations to determine the coordinates of a corresponding target point. In general, the angular filtering and transformation of the image light output by an OPA element according to this invention due to any operable angular filter portion configuration can be "reversed" to determine the desired target point coordinates from an image of the target point on the detector array. One such less desirable angular filter portion configuration that is nevertheless usable in various embodiments according to this invention may be provided by arranging a suitable lens to fulfill the Scheimpflug condition with respect to the image light output face 223 and the surface plane of the array detector 230 shown in FIG. 2, along with a limiting aperture proximate to the lens to provide angular filtering. Design of an optical layout that satisfies the Scheimpflug condition is described and/or taught in *Practical Optical System Layout and Use of Stock Lenses*, by Warren J. Smith. McGraw-Hill, New York, 1997, which is incorporated herein by reference for all of its relevant teachings. Thus, more generally than the embodiments of the angular filter portions 250, 550, 650 and 750, and the collimator arrays described previously, any now known or later developed angular filter portion configuration that is operable to transmit only direction-selected light rays of the output image light to form an image corresponding to a target feature on the detector array is usable according to the principles of this invention, with suitable image processing and/or coordinate transformations, even if the direction-selected light rays are not all parallel.

Figure 21:
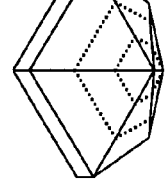
FIG. 21 illustrates and compares three different optical path elements usable in an OPA element according to this invention.

FIG. 21 illustrates and compares three different optical path elements usable in an OPA element according to this invention. The comparison is arranged in the form of a row-column table.

Row R-1 illustrates three generic types of optical path elements: A generic refractive conical axicon-type lens similar to the axicon lens described above with reference to FIGS. 16–20 is shown in column 21-A. A generic refractive faceted pyramidal-type lens is shown in column 21-B. A portion of a long and narrow ridge-like refractive element having a prismatic cross section is shown in column 21-C.

Row R-2 illustrates a small portion of various respective 2-dimensional array pattern configurations that use the optical path elements shown in row R-1 of the same respective column. The respective array pattern configurations may be used in various respective OPA elements according to this invention.

Each cell in row R-3 illustrates a typical arrangement of two target features, T and B, as they might appear on a typical target member. Each cell may also be regarded as the image that would appear on the camera of a position sensor arrangement according to this invention if each target feature had a z-axis coordinate of "0".

Each cell in row R-4 schematically illustrates two respective images of the target feature arrangement above it in row R-3, approximately as they would appear on the camera of a position sensor arrangement according to this invention when the OPA element of the position sensor uses the respective optical path elements shown in the same respective column. On the right side of each cell is an image that results when the target feature arrangement of row R-3 is "unrotated" relative to the 2-dimension array configuration shown above it in row R-2, "untilted" relative to a reference plane of the 2-dimension array configuration, and at a z-axis coordinate of "$z_1>0$". On the left side of each cell is an image that results when the target feature arrangement of row R-3 is rotated relative to the position sensor, as indicated by the altered orientation of the dashed line.

In column 21-A of row R-4, the previously described axicon-type optical path element results in the ring-shaped images previously described herein. However, in column 21-B of row R-4, the (similarly angled) six-faceted pyramidal-type optical path element does not result in a complete ring-shape. Rather, it results in 6 spots arranged around a similar hypothetical ring, corresponding to the six discrete facets of the optical path elements. By analogy, the conical elements shown in column 21-A might be considered to have an infinite number of facets, which produce an infinite number of spots that form a complete ring. Continuing by analogy, in column 21-C of row R-4, the arrangement of long and narrow ridge-like refractive elements having a (similarly angled) prismatic cross section results in 2 spots arranged on opposite sides of a similar hypothetical ring, corresponding to the two discrete facets of the optical path elements. Based on the foregoing, it should be appreciated that any "n-faceted" pyramidal-type optical path element will result in n image spots arranged in a manner analogous to the previous discussion.

Each cell in row R-5 shows respective images that are similar to the respective images directly above them in row R-4. The only difference is that the images in row R-5 correspond to a target member that is translated farther along the z-axis and tilted relative to the reference plane of the 2-dimension array configuration, such that the z-axis coordinate of target feature B is "$z_2>z_1$", and the z-axis coordinate of target feature T is "$z_3>z_2$". Accordingly, the size of each "target feature image" increases, as previously described herein for ring-shaped target feature images. That is, the radial spacing increases within each set of "T" and "B" image spots that respectively correspond to the T and B target features. Because the target feature T is at a z-axis coordinate $z_3$ that is greater than the z-axis coordinate $z_2$ of target feature B, the radial spacing in the "T" image spot sets is greater.

It should be appreciated from the foregoing discussion that, with suitable image processing, many variations of the generic optical path elements and corresponding 2-dimensional arrays outlined above can provide usable OPA element embodiments and operable position sensor arrangements according to this invention.

One advantage of optical path elements with relatively fewer facets is exemplified by the cross-shaped target feature and the resulting images shown in sub-column 21-C2. It should be appreciated that if an extended target feature, such as the cross-shaped target feature in sub-column 21-C2 were used with an optical path element having numerous facets, or an axicon, or a fiber, or the like, each point on the extended target would be imaged to a multiplicity of image points, resulting in a jumbled image, or a very wide ring, or the like. Although such images may still provide an operable position sensor according to this invention, accuracy or range or other characteristics will typically suffer. However, for optical path elements with relatively fewer facets, and especially with two facets, a blurred but distinguishable image of extended target features, such as the cross-shaped target feature, or line features, or suitably-spaced code patterns usable for providing absolute x-y position information, or the like, may be used in various exemplary embodiments according to this invention.

It is apparent from the images of sub-column 21-C2 that the cross-shape could be replaced by a box, a triangle, parallel line segments, longer line segments, etc. Thus, in various embodiments according to this invention, these and/or other more complex shapes or patterns of an operable size and shape are used to provide recognizable "absolute" codes to uniquely represent various areas on a target member. Thus, in various exemplary embodiments according to this invention, a 6-dimensional absolute position sensor is provided. In some such embodiments, known pattern matching or template matching image processing operations, or the like, are included in the image processing operations used to determine the locations and/or sizes of the various absolute code elements. In various other embodiments, a consistent target feature, for example a point feature, is provided proximate to each absolute code on a target member. In such embodiments the image features corresponding to the consistent target features are processed as previously outlined herein to provide high accuracy "local" measurements. In such embodiments, the absolute code is used only to provide a coarse measurement with enough resolution to be unambiguously combinable with a "local" measurement, in order to provide an overall high accuracy absolute measurement.

While this invention has been described in conjunction with the exemplary embodiments and configurations outlined above, it is evident that the embodiments and configurations described above are indicative of additional alternative embodiments, configurations, and combinations of design parameter values, as will be apparent to those skilled in the art having benefit of this disclosure. Accordingly, the embodiments of the invention, as set forth above, are intended to be illustrative, not limiting. Various changes may be made without departing from the spirit and scope of the invention.

The embodiments of the invention in which an exclusive property or privilege is claimed are defined as follows:

1. A position measuring device usable for measuring a relative position between the position measuring device and a target member, the position measuring device comprising:
an array detector;
an optical path array element comprising a plurality of similar optical path elements that each provide an input and an output for light rays, wherein the optical path elements are arranged such that their inputs are arranged along two dimensions corresponding to an input face of the optical path array element and their outputs are arranged along two dimensions corresponding to an output face of the optical path array element; and
an angular filter portion that only transmits respective light rays outputted from the optical path array element along a respective operable direction that is approximately parallel to an optical axis of the angular filter portion,
wherein:
the position measuring device is positionable to provide an image on the array detector that corresponds to at least a portion of the target member, the image arising from the transmitted light rays;
and the image on the array detector is usable to determine at least one measurement value that corresponds to at least one degree of freedom of the relative position between the position measuring device and the target member.

2. The position measuring device of claim 1, wherein:
the target member includes at least one respective target feature;
the at least one respective target feature gives rise to a corresponding respective image feature in the image on the array detector; and
the size of a corresponding respective image feature on the array detector is usable to determine an absolute measurement value for the corresponding respective target feature, the absolute measurement value corresponding to a translational degree of freedom along an axis that extends along a direction of separation between the position measuring device and the target member.

3. The position measuring device of claim 2, wherein:
the at least one respective target feature comprises at least three respective target features that give rise to corresponding respective image features;
the at least one measurement value comprises three measurement values corresponding to three translational degrees of freedom of the relative position between the measuring device and each of the at least three respective target features; and
the position measuring device is usable for measuring a six degree of freedom relative position between the position measuring device and the target member.

4. The position measuring device of claim 2, wherein the respective target feature is a target point, the respective image feature on the array detector comprises a ring-shaped image feature, and a nominal center location of the ring-shaped image feature on the array detector is usable to determine a relative displacement corresponding to two translational degrees of freedom along two mutually transverse axes that extend along a plane that is approximately normal to the direction of separation between the position measuring device and the target member.

5. The position measuring device of claim 4, wherein:
the ring-shaped image feature comprises one of an ellipse and a circle;
a function that is one of an ellipse and a circle is fitted to the ring-shaped image feature;
the center location of the function is usable to determine the relative displacement corresponding to the two translational degrees of freedom along the two mutually transverse axes; and
a radial dimension of the function is usable to determine the absolute measurement value corresponding to a translational degree of freedom along the axis that extends along a direction of separation between the position measuring device and the target member.

6. The position measuring device of claim 4, wherein:
the ring-shaped image feature comprises one of an ellipse and a circle;
the ring-shaped image feature has respective radial intensity profiles comprising the intensity values of respective sets of image pixels of the ring-shaped image feature lying along respective radial directions extending from a nominal center of the ring shaped feature;
a function that is one of an ellipse and a circle is fitted to a set of respective peaks determined for a set of respective radial intensity profiles;
the center location of the function is usable to determine the relative displacement corresponding to the two translational degrees of freedom along the two mutually transverse axes; and
a radial dimension of the function is usable to determine the absolute measurement value corresponding to a translational degree of freedom along the axis that extends along a direction of separation between the position measuring device and the target member.

7. The position measuring device of claim 1, wherein the position measuring device further comprises a light source.

8. The position measuring device of claim 7, wherein the light source is positioned to illuminate the target member through the optical path array element.

9. The position measuring device of claim 1, wherein the angular filter portion is configured such that it selectively transmits only light rays that are approximately parallel to an optical axis of the angular filter portion and the optical axis is arranged along a direction that is one of a) a direction approximately normal to a reference plane that is parallel to a nominal plane of the optical path array element, and b) a direction that is angled relative to a direction that is normal to a reference plane that is parallel to a nominal plane of the optical path array element.

10. The position measuring device of claim 9, wherein:
the optical axis of the angular filter portion is arranged along a direction that is approximately normal to the reference plane;
light rays from the optical path array element are refracted at a refracting surface that is inclined at an angle relative to the reference plane such that the light rays that are approximately parallel to the optical axis comprise light rays that are refracted at the refracting surface; and
the refracting surface comprises one of a) a surface of a prism element that receives the output image light, and b) a surface provided by a set of optical path elements that comprise a set of optical fibers, the surface formed by the angled ends of the set of optical fibers.

11. The position measuring device of claim 10, wherein:
the position measuring device further comprises a light source and a beam splitter;

the angular filter portion comprises a first lens arranged to receive the light rays that are refracted at the refracting surface and an aperture arranged at a focal plane where the light rays from the first lens are nominally focused;

the beam splitter is arranged along the optical axis between the first lens and the aperture such that the light rays from the first lens pass through the beam splitter before being nominally focused at the focal plane; and the light source is arranged relative to the beam splitter such that illumination from the light source is deflected by the beam splitter to pass through the first lens and the optical path array element to illuminate the target member.

12. The position measuring device of claim 9, wherein:
the angular filter portion comprises one of a) a first lens arranged along the optical axis to receive the light rays from the optical path array element and an aperture arranged along the optical axis at a focal plane where light rays from the first lens that are nominally parallel when entering the first lens are nominally focused, and b) a collimator array of long, narrow, tube-like structures that have parallel axes and that provide a small acceptance angle for input light rays.

13. The position measuring device of claim 12, wherein the angular filter portion comprises a second lens having a focal distance F, and the second lens is located along the optical axis at the distance F from the aperture, between the aperture and the array detector.

14. The position measuring device of claim 1, wherein:
the target member includes at least two respective target features;

the at least two respective target features give rise to corresponding respective image features in the image on the array detector; and when a separation between the position sensing device and the target member is increased, the size of each of the respective image features increases on the array detector, but a spacing between respective nominal centers of the respective image features does not increase on the array detector.

15. The position measuring device of claim 1, wherein the target member comprises a two-dimensionally periodic array of target features that effectively comprise point features.

16. The position measuring device of claim 1, wherein the optical path array element comprises an optical fiber bundle comprising parallel optical fibers, the plurality of optical path elements comprise a plurality of the parallel optical fibers, and the optical fiber bundle is configured such that input light rays from the target member are input through a planar face of the optical fiber bundle, the planar face comprising coplanar ends of the plurality of parallel optical fibers.

17. The position measuring device of claim 16, wherein the parallel optical fibers are nominally cylindrical.

18. The position measuring device of claim 17, wherein the parallel optical fibers have a diameter of at least 3 μm and at most 80 μm.

19. The position measuring device of claim 1, wherein:
the optical path array element comprises a two-dimensional array of coplanar lenses;

the plurality of optical path elements comprise a plurality of the lenses; and the array of coplanar lenses is arranged such that input light rays from the target member are input to the plurality of lenses and deflected by the plurality of lenses, to provide the light rays that are selectively transmitted by the angular filter portion.

20. The position measuring device of claim 19, wherein an array pitch along at least one direction of the two-dimensional array is at least 3 μm and at most 150 μm.

21. The position measuring device of claim 19, wherein the lenses are located on a side of the optical path array element that is oriented towards the target member, and the angular filter portion selectively transmits light rays from the optical path array element that are deflected along a direction that is approximately normal to a nominal plane of the coplanar lenses.

22. The position measuring device of claim 19, wherein each optical path element comprise one of: a) a refractive axicon-type lens, b) a refractive faceted pyramidal-type lens having at least 3 facets, c) a diffractive optical element that deflects light rays approximately like a refractive axicon-type lens, and d) a diffractive optical element that deflects light rays approximately like a refractive faceted pyramidal-type lens having at least 3 facets.

23. The position measuring device of claim 22, wherein each optical path element comprises one of: a) a refractive axicon-type lens, and b) a refractive faceted pyramidal-type lens having at least 3 facets, and each optical path element comprises an operable refractive surface that is one of: a) a protruding surface, and b) an intruding surface.

24. The position measuring device of claim 19, wherein each optical path element comprises one of: a) a relatively long and narrow ridge-like element having a prismatic cross section, and b) a diffractive optical element that deflects light rays approximately like a relatively long and narrow ridge-like element having a prismatic cross section.

25. The position measuring device of claim 24, wherein the target member comprises a plurality of respective unique patterns usable to uniquely identify respective regions of the target member.

26. A position measuring device usable for measuring a relative position between the position measuring device and a target member, the position measuring device comprising:
an array detector;

an optical path array element comprising a plurality of similar optical path elements that each provide an input and an output for light rays, wherein the optical path elements are arranged such that their inputs are arranged along two dimensions corresponding to an input face of the optical path array element and their outputs are arranged along two dimensions corresponding to an output face of the optical path array element, the optical path array element positionable to input image light from the target member; and an angular filter portion having an optical axis, the angular filter portion positioned to receive output image light from the optical path array element and having direction-selecting characteristics such that it is operable to transmit only light rays of the output image light that are approximately parallel to its optical axis to form an image corresponding to at least a portion of the target member on the array detector, wherein:
the target member includes at least one respective target feature;

the image corresponding to at least a portion of the target member on the array detector includes at least one respective image feature corresponding to a respective target feature;

each respective image feature corresponding to a respective target feature is defined by a set of light rays of the input image light that enter a respective set of optical path elements that are effectively direction-selected relative to the respective target feature, based at least partly on the direction-selecting characteristics of the angular filter portion; and for at least one respective target feature at least one of a size and a position of the corresponding respective image feature on the array detector is usable to determine at least one measurement value for the respective target feature, the at least one measurement value corresponding to at least one translational degree of freedom of the position measuring device position relative to the at least one respective target feature.

27. The position measuring device of claim 26, wherein the at least one respective target feature comprises at least three respective target features, the at least one measurement value comprises three measurement values corresponding to three translational degrees of freedom of the position measuring device position relative to each of the at least three respective target features, and the position measuring device is usable for measuring a 6-degree-of-freedom relative position between the position measuring device and the target member.

* * * * *